(12) United States Patent
Hunter et al.

(10) Patent No.: US 9,878,921 B2
(45) Date of Patent: Jan. 30, 2018

(54) OUTLET FOR SHOWER OR FAUCET HEAD

(71) Applicant: PALL CORPORATION, Port Washington, NY (US)

(72) Inventors: Alastair J. Hunter, Southsea (GB); Timothy J. Wilkinson, Fareham (GB)

(73) Assignee: Pall Corporation, Port Washington, NY (US)

(*) Notice: Subject to any disclaimer, the term of this patent is extended or adjusted under 35 U.S.C. 154(b) by 3 days.

(21) Appl. No.: 15/583,277

(22) Filed: May 1, 2017

(65) Prior Publication Data

US 2017/0239680 A1 Aug. 24, 2017

Related U.S. Application Data

(63) Continuation of application No. 13/217,622, filed on Aug. 25, 2011, which is a continuation-in-part of application No. 12/877,300, filed on Sep. 8, 2010, now abandoned.

(51) Int. Cl.

| | |
|---|---|
| *E03C 1/04* | (2006.01) |
| *C02F 1/00* | (2006.01) |
| *B05B 1/18* | (2006.01) |
| *B05B 12/00* | (2006.01) |
| *B05B 15/00* | (2006.01) |
| *B01D 35/153* | (2006.01) |
| *C02F 1/50* | (2006.01) |
| *B05B 1/34* | (2006.01) |

(52) U.S. Cl.
CPC ............ *C02F 1/003* (2013.01); *B01D 35/153* (2013.01); *B05B 1/18* (2013.01); *B05B 12/004* (2013.01); *B05B 12/008* (2013.01); *B05B 15/008* (2013.01); *E03C 1/0409* (2013.01); *B05B 1/34* (2013.01); *C02F 1/505* (2013.01); *C02F 2209/44* (2013.01); *C02F 2303/04* (2013.01); *C02F 2307/06* (2013.01); *Y02W 10/37* (2015.05)

(58) Field of Classification Search
None
See application file for complete search history.

(56) References Cited

U.S. PATENT DOCUMENTS

| | | | |
|---|---|---|---|
| 1,499,347 A | 2/1978 | Conte | |
| 4,203,550 A | 5/1980 | On | |
| 2,463,880 A | 8/1984 | Kramer et al. | |
| 4,463,880 A * | 8/1984 | Kramer | B65D 47/42 |
| | | | 222/189.08 |
| 6,264,936 B1 | 7/2001 | Sawan et al. | |

(Continued)

FOREIGN PATENT DOCUMENTS

| | | |
|---|---|---|
| CN | 1432540 A | 7/2003 |
| EP | 0 939 591 A1 | 9/1999 |

(Continued)

OTHER PUBLICATIONS

JP 2004-344888A—USPTO Human Translation, 2014, 47 pages.*

(Continued)

*Primary Examiner* — Patrick J Orme
(74) *Attorney, Agent, or Firm* — Leydig Voit & Mayer

(57) ABSTRACT

Removable and replaceable outlets for point-of-use showers or faucets, filter devices, and methods and systems including the outlets and/or filter devices, are disclosed.

4 Claims, 17 Drawing Sheets

(56) References Cited

U.S. PATENT DOCUMENTS

| | | | |
|---|---|---|---|
| 6,321,777 B1* | 11/2001 | Wu | F16K 27/045 137/315.12 |
| 7,004,410 B2 | 2/2006 | Li | |
| 7,182,858 B2 | 2/2007 | Brown et al. | |
| 7,235,176 B1 | 6/2007 | Takagi et al. | |
| 2005/0023223 A1 | 2/2005 | Seisuke et al. | |
| 2005/0224406 A1 | 10/2005 | Takagi et al. | |
| 2006/0108267 A1 | 5/2006 | Warren et al. | |
| 2012/0055888 A1 | 3/2012 | Hunter et al. | |

FOREIGN PATENT DOCUMENTS

| | | | |
|---|---|---|---|
| EP | 1 457 464 A1 | 9/2004 | |
| EP | 1 473 073 A1 | 11/2004 | |
| GB | 1 499 347 A | 2/1978 | |
| GB | 1499347 A * | 2/1978 | B01D 29/56 |
| GB | 2 233 246 A | 1/1991 | |
| GB | 2 257 052 A | 1/1993 | |
| GB | 2 437 279 A | 10/2007 | |
| GB | 2437279 A * | 10/2007 | B82Y 30/00 |
| JP | 60-46106 U | 4/1985 | |
| JP | 5-67389 U | 9/1993 | |
| JP | 11239740 A2 | 9/1999 | |
| JP | 2000300458 A2 | 10/2000 | |
| JP | 2003225656 A | 8/2003 | |
| JP | 2004344888 A * | 12/2004 | E03C 1/10 |
| JP | 2004344888 A2 | 12/2004 | |
| JP | 2006348966 A2 | 12/2006 | |
| WO | WO 98/18330 A1 | 5/1998 | |
| WO | WO 01/54822 | 8/2001 | |
| WO | WO 2006/084448 | 8/2006 | |

OTHER PUBLICATIONS

"Pall-Aquasafe disposable water filters for 7 day use," CC93a, p. 1-16, Pall Corporation (2004).

Canadian Intellectual Property Office, Office Action in Canadian Application No. 2,751,904, dated Oct. 11, 2013.

European Patent Office, Extended European Search Report in European Application No. 11 17 9258, dated Dec. 29, 2011.

Intellectual Property Office of Singapore, Search Report in Singapore Application No. 201105950-8, dated Oct. 18, 2012.

Intellectual Property Office of Singapore, Written Opinion in Singapore Application No. 201105950-8, dated Nov. 13, 2013.

Notice of Reasons for Rejection, Japanese Application No. P2011-178020, dated Mar. 26, 2013.

Sheffer et al., "Efficacy of new point-of-use water filter for preventing exposure to Legionella and waterborne bacteria," *AJIC*, 33:5 S20-S25 (2005).

State Intellectual Property Office of the People's Republic of China, Search Report in Counterpart Chinese Application No. 201110268125.9, dated May 6, 2014.

* cited by examiner

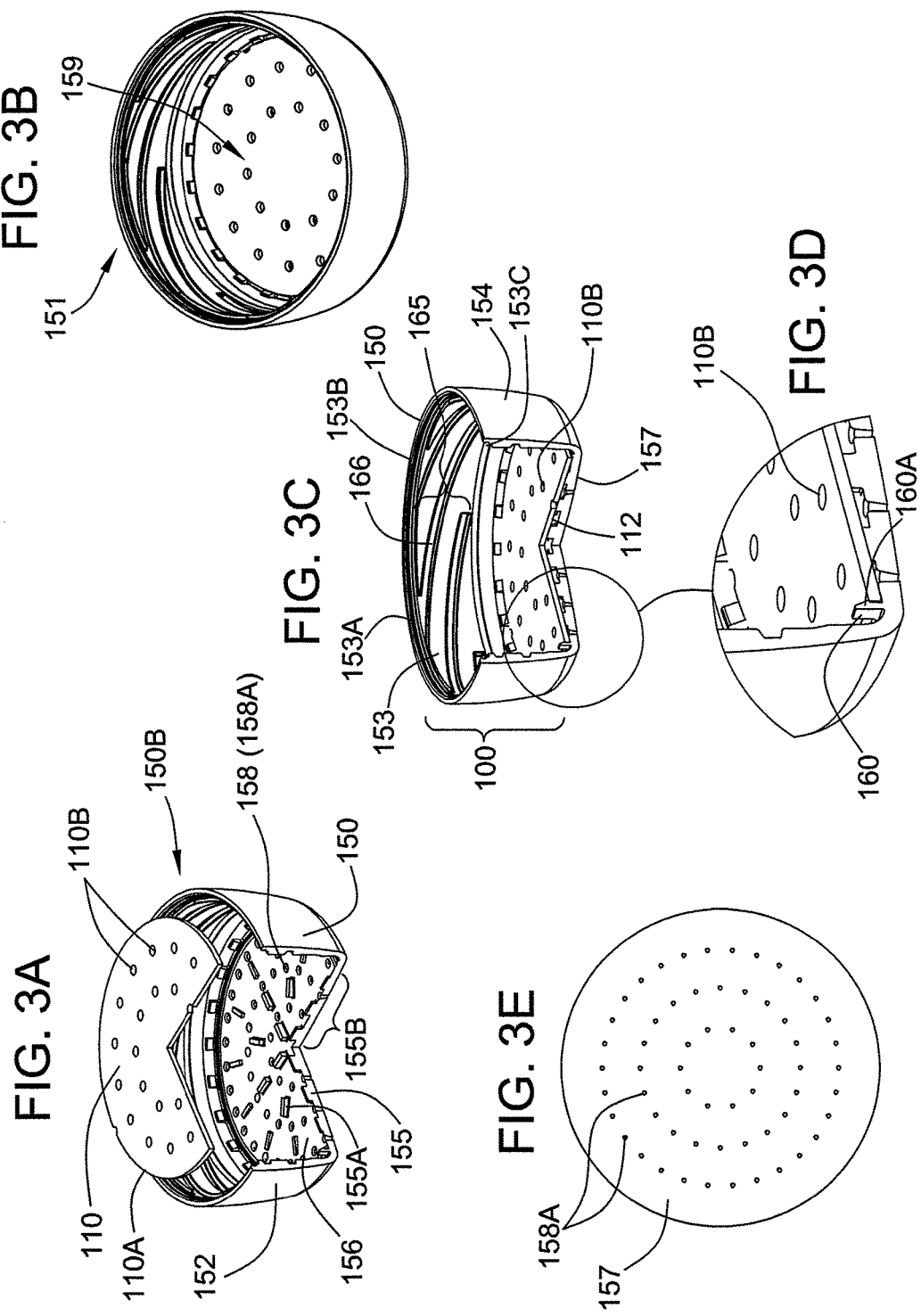

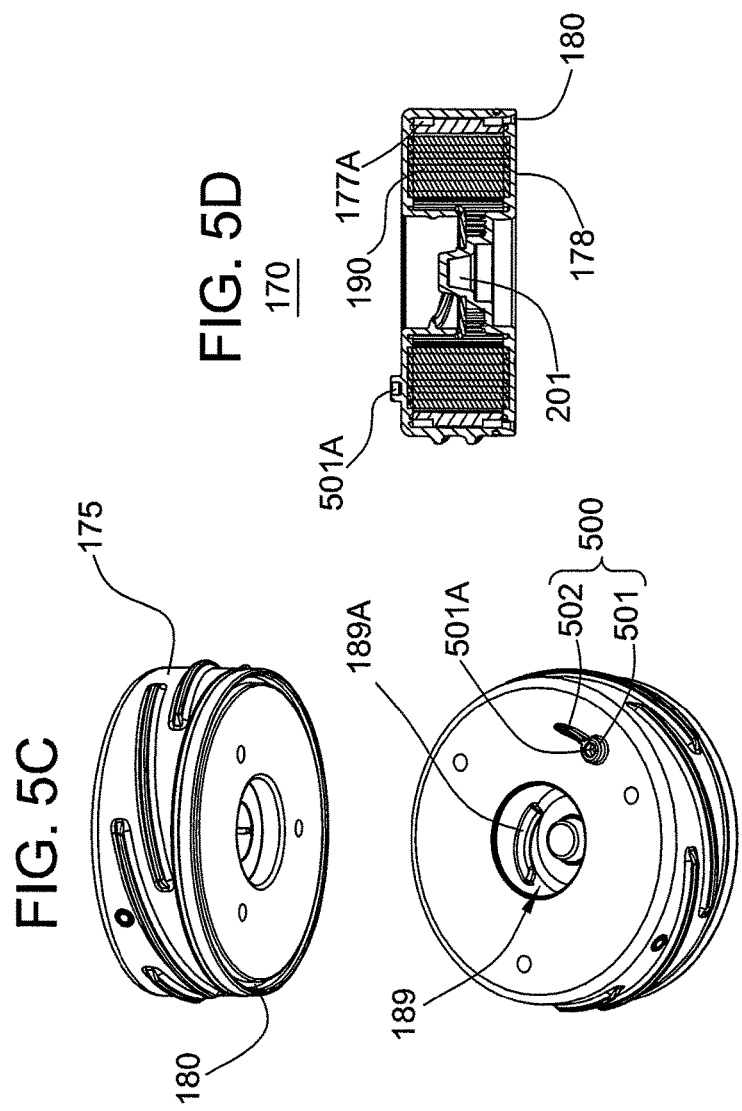

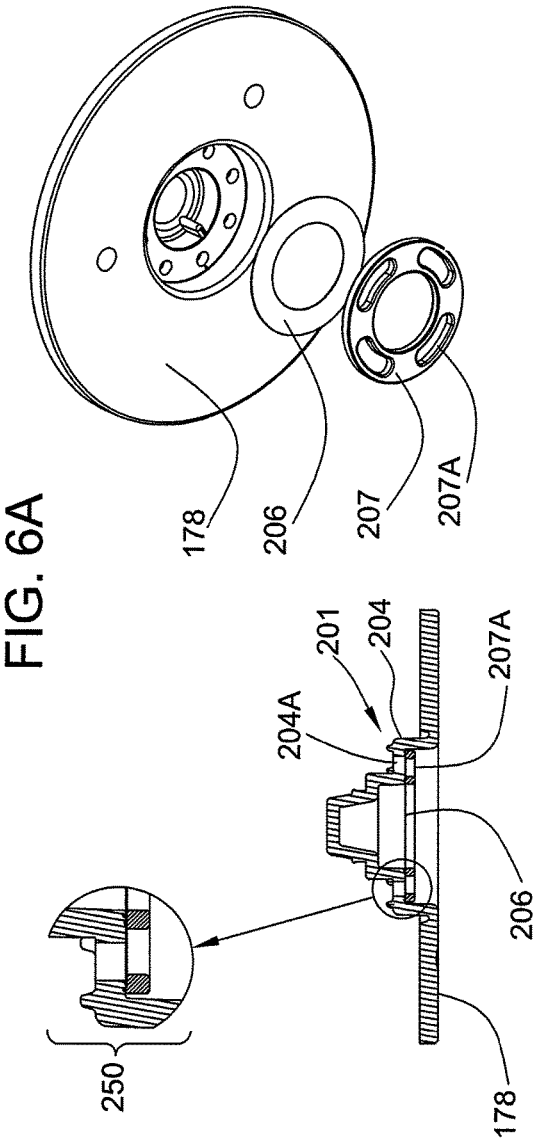
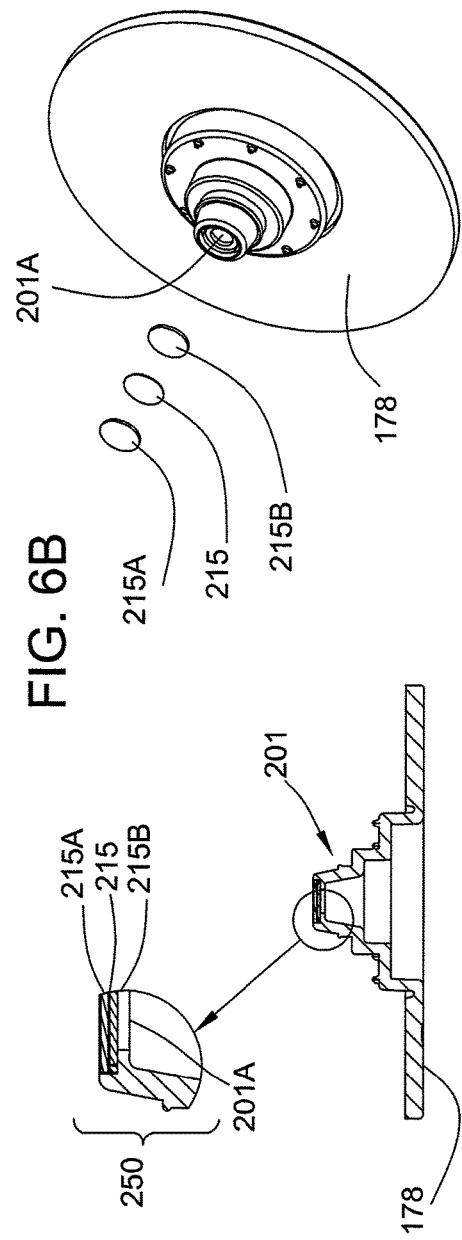

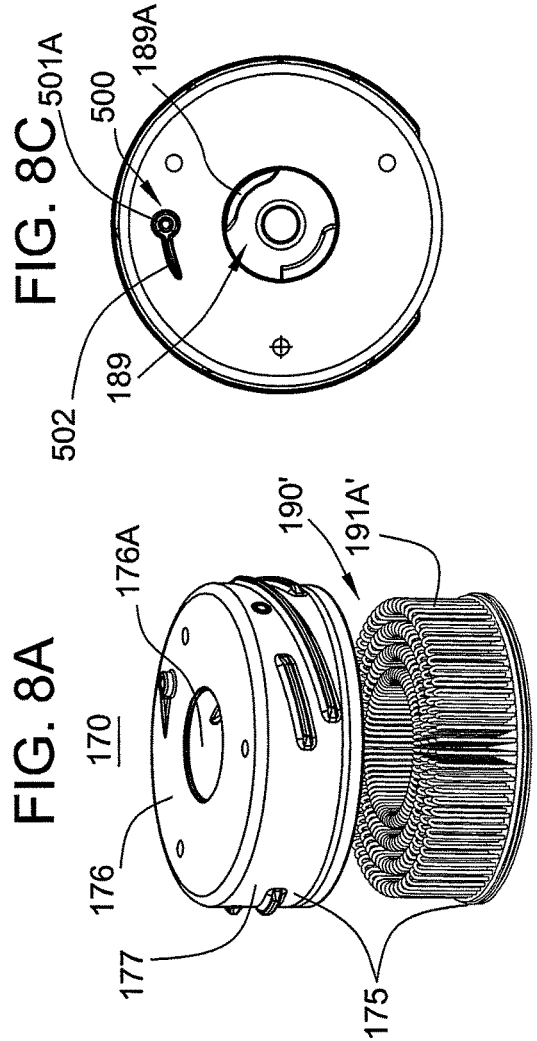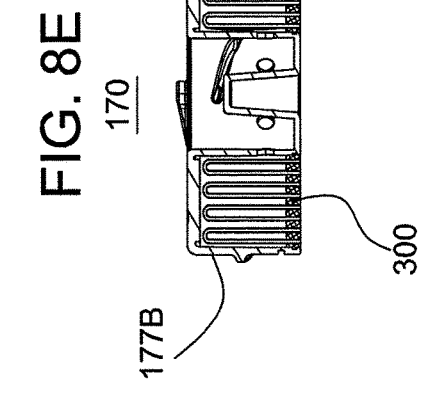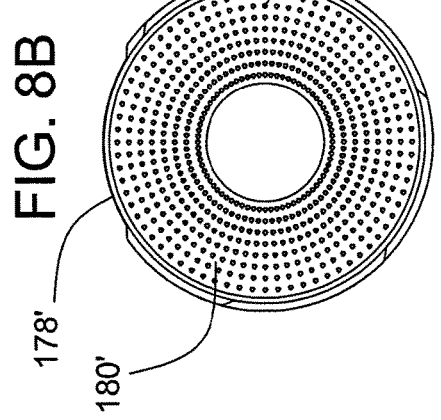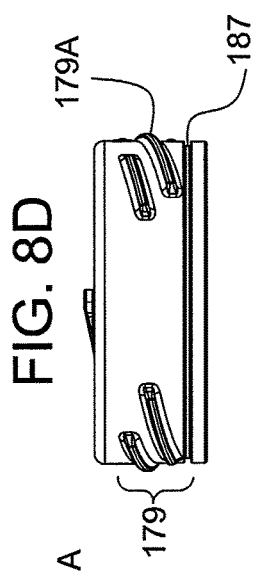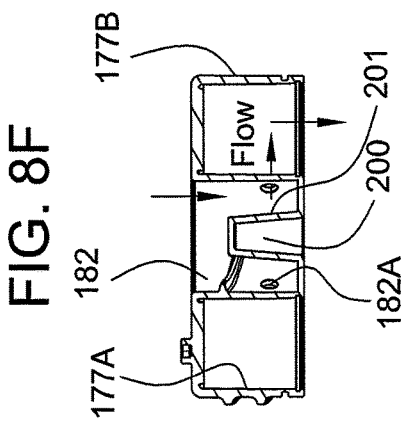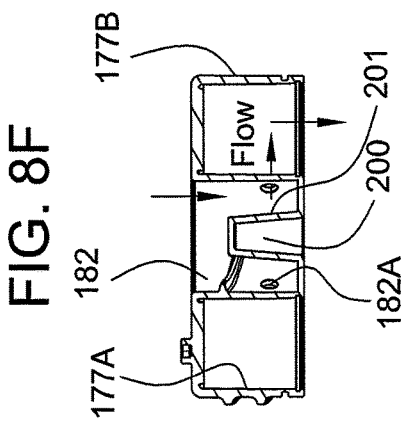

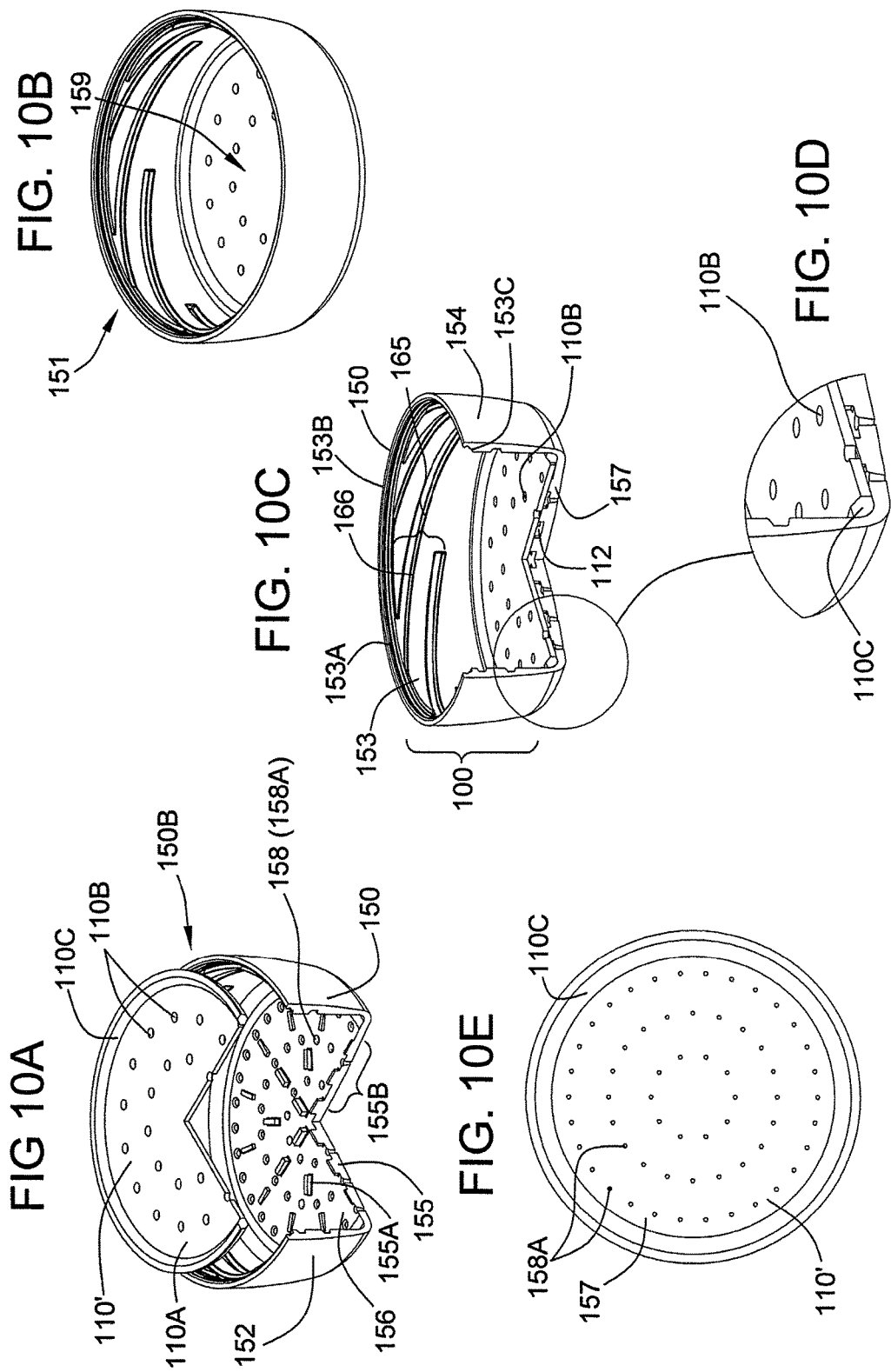

OUTLET FOR SHOWER OR FAUCET HEAD

CROSS-REFERENCE TO RELATED APPLICATIONS

This patent application is a continuation-in-part of copending U.S. patent application Ser. No. 12/877,300, filed Sep. 8, 2010, which is incorporated by reference.

BACKGROUND OF THE INVENTION

Contamination of water dispensed from a shower or faucet to a person who may be vulnerable to infection can be undesirable, as exposure to contaminants such as pathogens can lead to, for example, debilitating and costly infections, even morbidity. In order to reduce the risks of such exposure, disposable point-of-use showerhead filter devices can be attached to showerheads to prevent various contaminants, e.g., waterborne pathogens such as fungal spores, bacteria, and protozoa, from being dispersed into the environment at the point of use where the person taking a shower can be exposed to the pathogen(s).

Such showerhead filter devices can prevent the passage of pathogens toward the person while the water is dispensed (dispensed during a "use cycle"). Instructions for using the filter devices indicate the devices should be used for no more than a set period of time, e.g., 7 days, and then replaced, primarily due to the risk of retrograde contamination of the device outlet area over time and/or use.

However, the present inventors have discovered that these filter devices suffer from some disadvantages.

BRIEF SUMMARY OF THE INVENTION

An embodiment of the invention provides an outlet for a point of use shower or a faucet, the shower or faucet including an attachment head, and a sterilizing grade water filter device comprising a porous sterilizing grade water filter, a water effluent portion, and a side wall having an external surface; the filter device being in fluid communication with, and removably connected to, the shower head or the faucet head, and the outlet; the outlet comprising: an outlet housing comprising a polymeric shell, preferably, a bacteriostatic polymeric shell, the shell comprising a side wall having a side wall inner surface and a side wall outer surface, a bottom wall having an inner face, an outer face, and a plurality of outlet ports, each port comprising an opening allowing water flow from the inner face through the outer face, and a cavity defined by the side wall inner surface and the bottom wall inner face, wherein both the side wall outer surface and the bottom wall outer face contact environmental air surrounding the shower head or the faucet head, and; a polymeric hydrophobic porous disc, preferably, a hydrophobic bacteriostatic porous disc, contained in the cavity of the polymeric shell, the hydrophobic porous disc comprising a plurality of pores and having an upstream surface and a downstream surface, the downstream surface facing the inner face of the bottom wall, wherein the side wall inner surface of the shell includes a mounting element releasably engageable with the external surface of the side wall of the filter device, the outlet cavity being suitable for receiving at least a portion of the filter device. Preferably, the pores in the hydrophobic porous disc are effectively offset from the outlet ports In another embodiment, a water sterilizing filter device is provided, comprising: a porous water sterilizing filter comprising at least one porous element; and, a housing containing the filter and providing a fluid flow path through the filter, the housing comprising an inlet and a water effluent portion and defining the fluid flow path between the inlet and the water effluent portion, wherein the housing comprises a bottom wall having an outer edge, a side wall having an internal surface and an external surface comprising threads, and the water effluent portion, wherein the water effluent portion is between the outer edge of the bottom wall, and the internal surface of the side wall.

In yet another embodiment, a water sterilizing filter device is provided, comprising: a porous water sterilizing filter comprising at least one porous element; and, a housing containing the filter and providing a fluid flow path through the filter, the housing comprising an inlet and a water effluent portion and defining the fluid flow path between the inlet and the water effluent portion, wherein the housing comprises a bottom wall comprising the water effluent portion, a side wall having an internal surface and an external surface comprising threads.

In yet another embodiment, a system is provided, comprising a shower head or a faucet head, a porous water sterilizing filter device, and a removable outlet. In a preferred embodiment, the system further comprises a display for notifying the user as to when the filter device and/or the outlet was installed and/or for notifying the user as to when the filter device and/or outlet should be replaced.

An embodiment of the invention also provides a method for dispensing water, comprising passing water through the porous water sterilizing filter device, and the removable outlet.

In another embodiment, a method for reducing retrograde contamination comprises removing the outlet from the porous water sterilizing filter device, and replacing the outlet. In yet another embodiment, a method for reducing retrograde contamination comprises connecting a removable outlet to the porous water sterilizing filter device.

BRIEF DESCRIPTION OF THE SEVERAL VIEWS OF THE DRAWING(S)

FIGS. 1A and 1B show exploded views showing an embodiment of a faucet head system, as well as embodiments of components of the faucet head system, according to the invention, comprising a faucet head (illustrated with an electronic display), a filter device, and an outlet comprising an outlet housing and an outlet disc element. FIG. 1A shows an outlet housing comprising a jet housing as well as an outlet housing comprising a shower housing.

FIG. 3(A-E) shows various views of the outlet with a shower housing shown in FIG. 1, and of the outlet disc element. FIG. 3A shows an cut-away exploded isometric view of an outlet disc element and the shower housing; FIG. 3B shows an isometric view of the outlet with the outlet disc element assembled in the housing; FIG. 3C shows a cut-away view of the outlet with the outlet disc element assembled in the housing; FIG. 3D shows an enlarged view of a portion of FIG. 3C showing the outlet disc retained in the housing; FIG. 3E shows a bottom view of the shower housing.

Figure 4A:
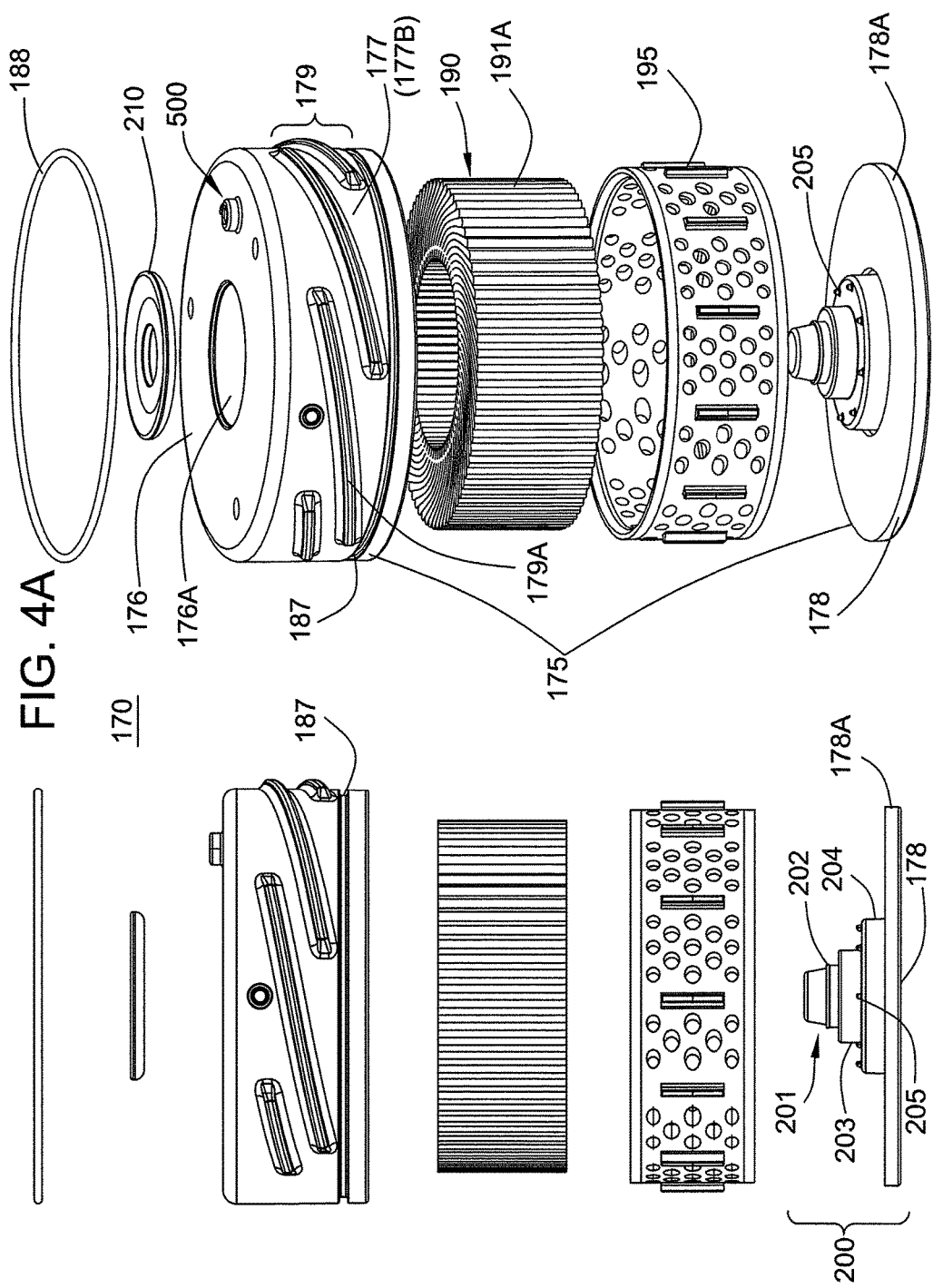
Figure 4B:
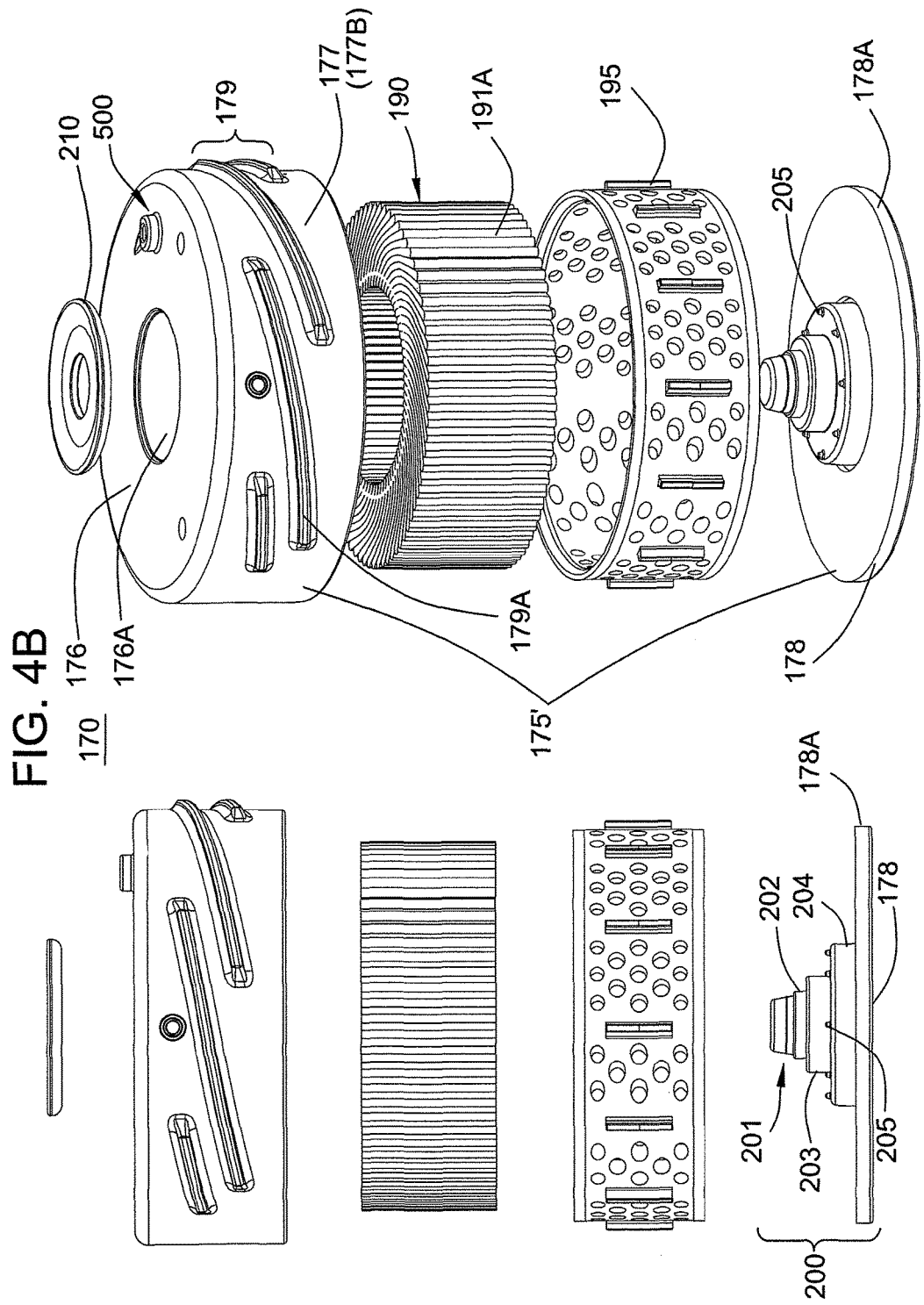

FIGS. 4A and 4B show exploded views of two embodiments of a filter device according to the invention, each comprising a porous sterilizing water filter and a filter device housing.

FIG. 5(A-D) shows various views of an embodiment of an assembled filter device housing according to the invention. FIG. 5A shows a top view, FIG. 5B shows a bottom view, FIG. 5C shows isometric views, and FIG. 5D shows a section view.

FIGS. 6A and 6B show variations of a part of a filter device housing, wherein the filter device includes at least one vent for separating air from the water flow path.

Figure 7:
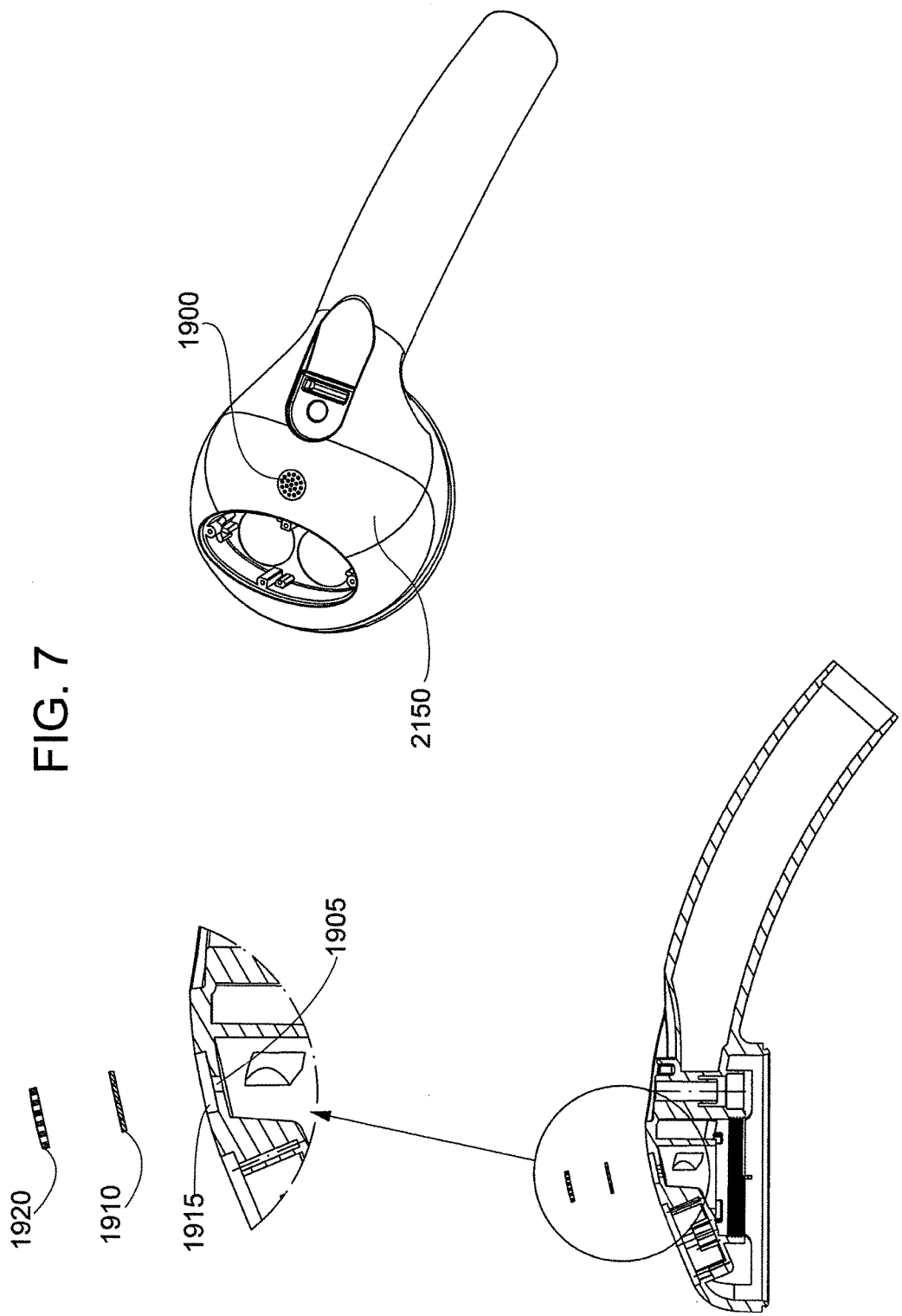

FIG. 7 shows an isometric view, a cross-sectional view, and an enlarged partial cross-sectional view, of another embodiment of a shower head housing, also including a vent.

FIG. 8 shows another embodiment of a filter device according to the invention comprising a porous sterilizing water filter comprising hollow fibers and a filter device housing. FIG. 8A shows an exploded view of the filter and housing, FIG. 8B shows a bottom view of the housing, FIG. 8C shows a top view of the housing, FIG. 8D shows side view of the housing, FIG. 8E a section view of the housing with the filter, and FIG. 8F shows a section view of the housing without the filter.

Figure 9A:
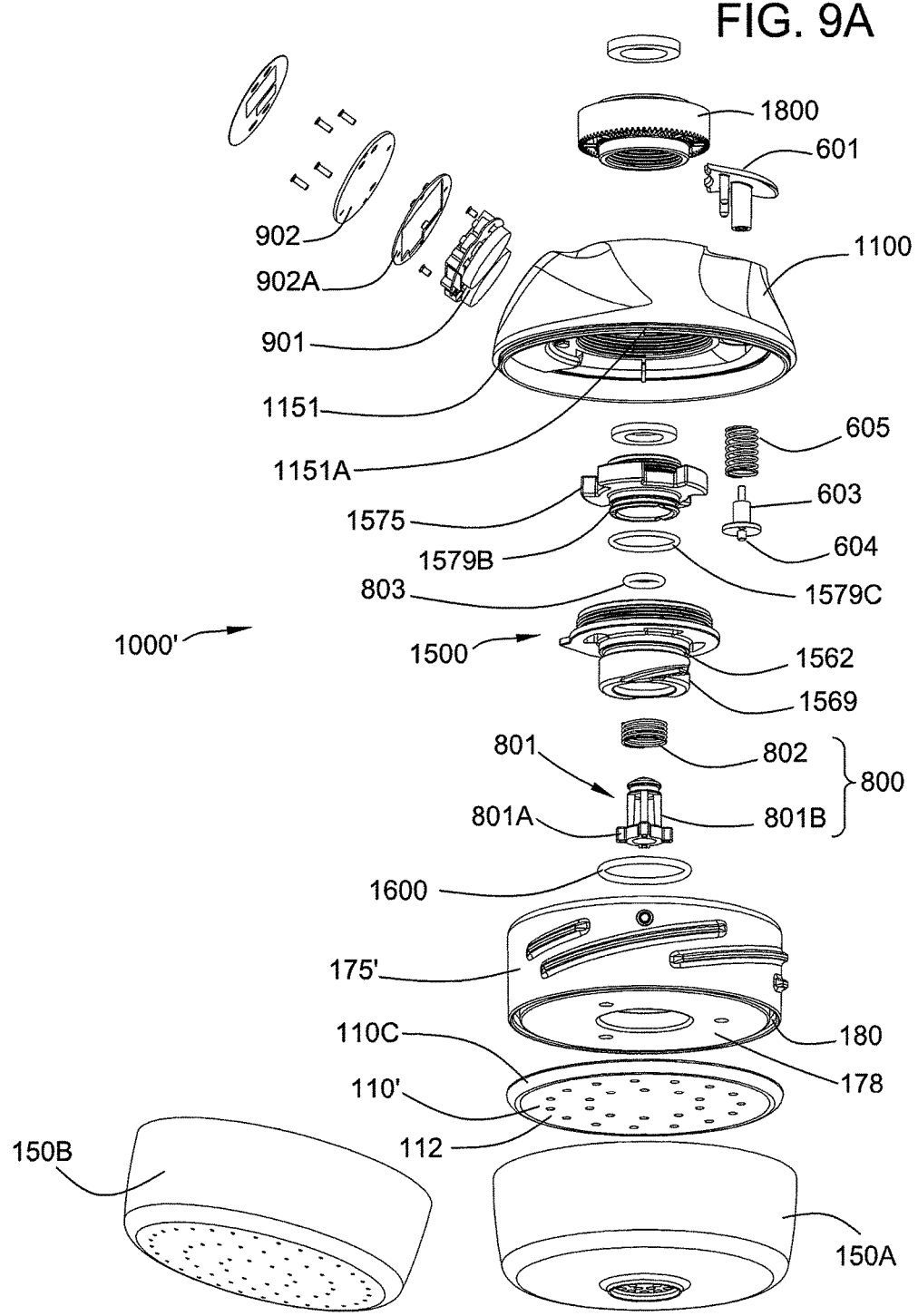
Figure 9B:
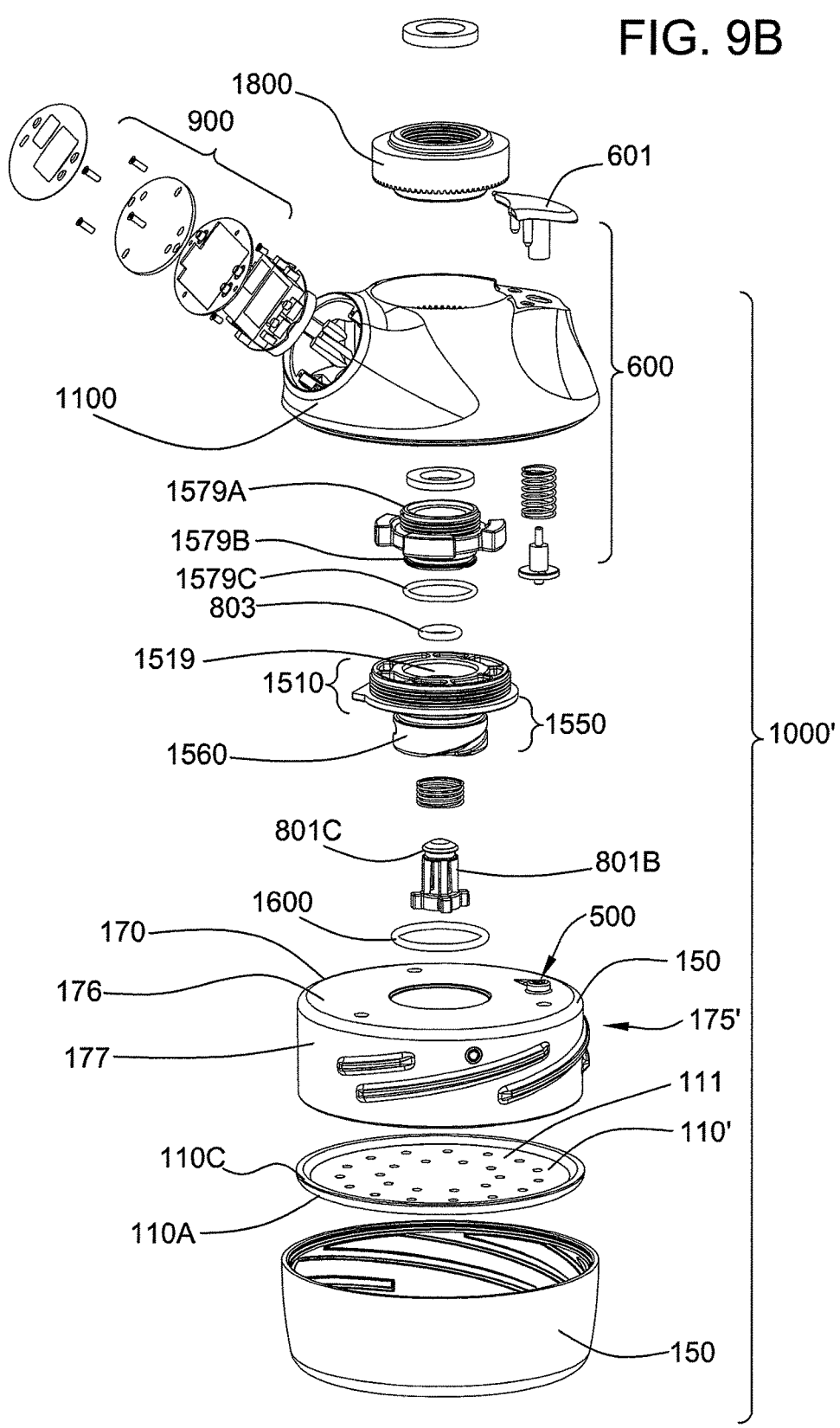

FIGS. 9A and 9B show exploded views showing another embodiment of a faucet head system, as well as embodiments of components of the faucet head system, according to the invention, comprising a faucet head (illustrated with an electronic display), a filter device, and an outlet comprising an outlet housing and an outlet disc element. FIG. 9A shows an outlet housing comprising a jet housing as well as an outlet housing comprising a shower housing.

Figure 9C:
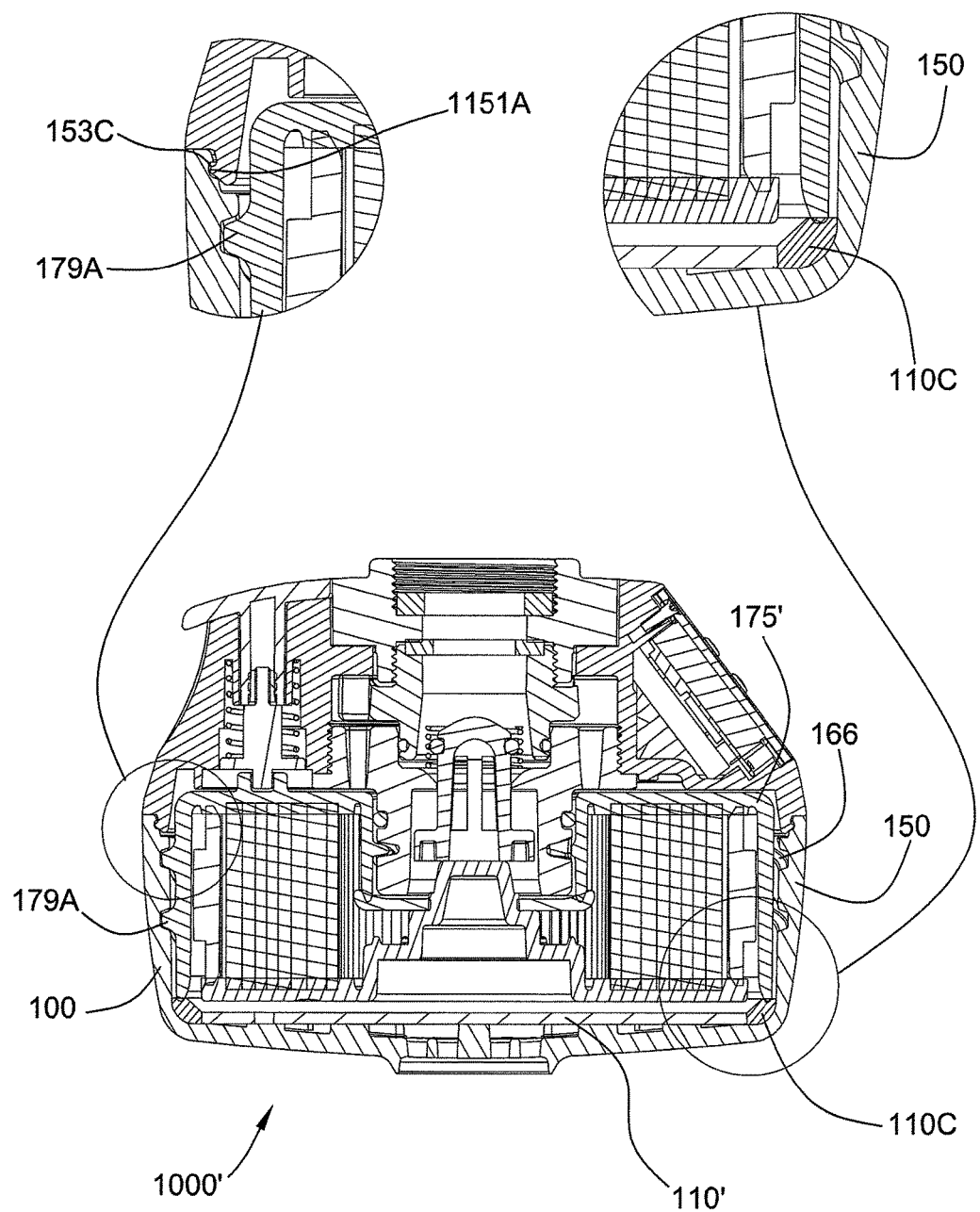

FIG. 9C is a cross-sectional view of the faucet head system shown in FIGS. 9A and 9B, after assembly, also showing, in enlarged views, a tight seal between the outlet and the faucet attachment head, and a hermetic seal between the outlet and the filter device.

FIG. 10(A-E) shows various views of the outlet with a shower housing shown in FIGS. 9A and 9B, and of the outlet disc element. FIG. 10A shows an cut-away exploded isometric view of an outlet disc element and the shower housing; FIG. 10B shows an isometric view of the outlet with the outlet disc element assembled in the housing; FIG. 10C shows a cut-away view of the outlet with the outlet disc element assembled in the housing; FIG. 10D shows an enlarged view of a portion of FIG. 10C showing the outlet disc retained in the housing; FIG. 10E shows a bottom view of the shower housing.

Figure 11:
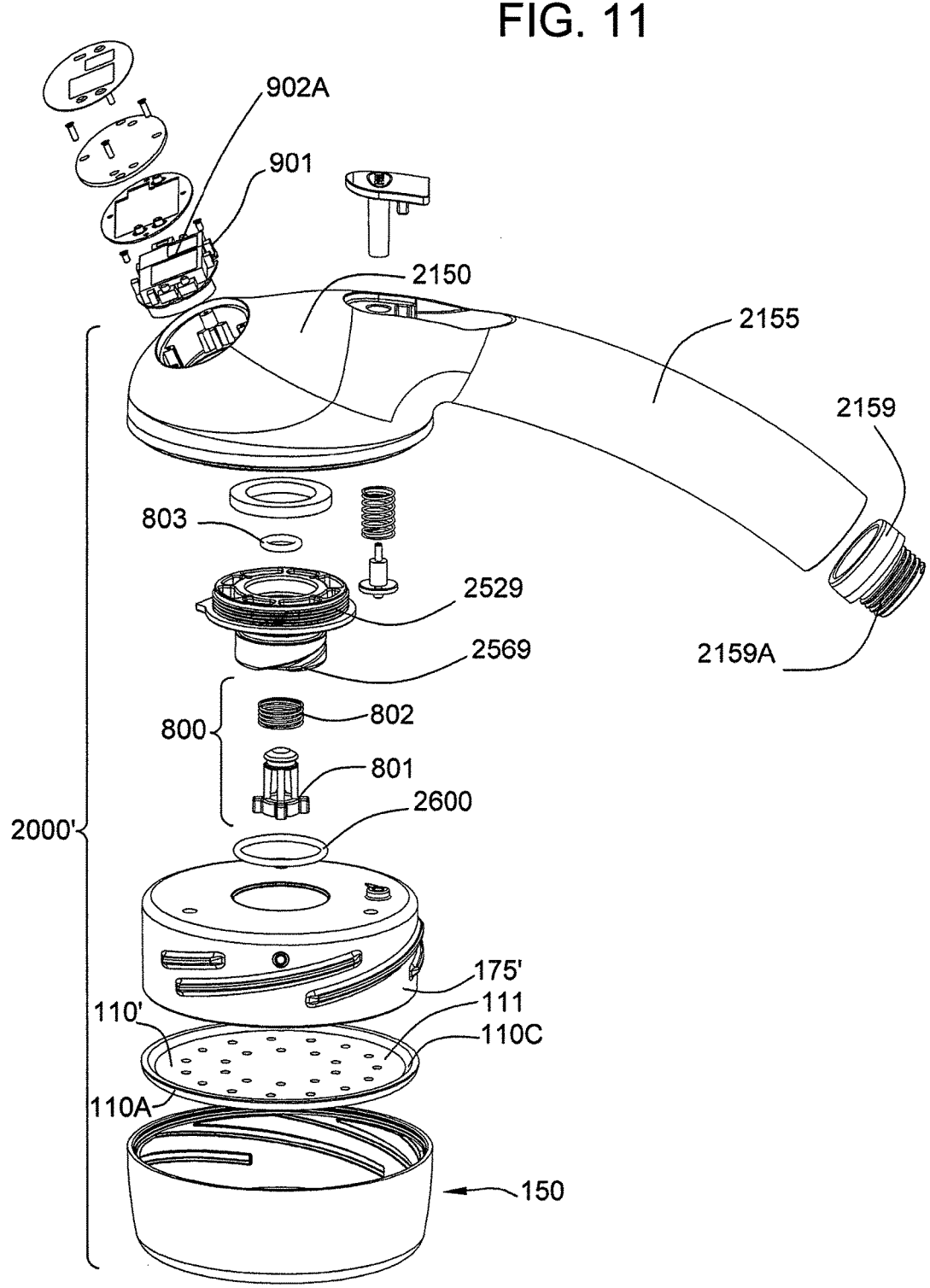

FIG. 11 shows an exploded view showing another embodiment of a shower head system, as well as embodiments of components of the shower head system, according to the invention, comprising a shower head (illustrated with an electronic display), a filter device, and an outlet comprising an outlet housing and an outlet disc element.

DETAILED DESCRIPTION OF THE INVENTION

Removable outlets for showers and faucets according to the invention can prevent or reduce contamination of the water dispensed from a shower head or faucet during a use cycle, e.g., by reducing or eliminating the amount of residual filtered water remaining in association with the external surface of the shower head or faucet after dispensing, as such residual water could potentially accumulate contaminants. Moreover, airborne and/or waterborne contaminants can be prevented from migrating into the interior of the shower head or faucet and/or the water filtration device (the migration leading to "retrograde contamination") and compromising the sterility of the water that is dispensed from the head and/or filter device, e.g., during a subsequent use cycle. Accordingly, the quality of the filtered water product and the service life of a water filter device and/or water filter may be safeguarded by the outlets of the invention.

Since the outlet can prevent retrograde contamination of the filter and/or filter device (and associated components such as a shower head), another advantage of replaceable outlets according to the invention is the cost savings and the environmental benefits resulting from replacing the less expensive outlet and extending the service life of the more expensive filter.

The point-of-use showers and faucets according to embodiments of the invention are suitable for use with any water supply system in, for example, hospitals, public areas, hotels, and households.

An outlet according to an embodiment of the invention, which is suitable for use with faucet tap systems and shower systems, comprises an outlet housing comprising a polymeric shell comprising a side wall having a side wall inner surface and a side wall outer surface, a bottom wall having an inner face, an outer face, and a plurality of outlet ports, each port comprising one or more openings allowing water flow from the inner face through the outer face, and a cavity defined by the side wall inner surface and the bottom wall inner face. The outlet housing is configured for removable connection to one or more other components of the faucet tap system or shower head system, e.g., the outlet housing may include one or more threads on the side wall inner surface and/or side wall outer surface.

In a preferred embodiment, the outlet further comprises a polymeric hydrophobic porous disc, preferably, a polymeric hydrophobic bacteriostatic porous disc, contained in the cavity of the polymeric shell, the hydrophobic porous disc comprising a polymeric hydrophobic porous element, preferably, a polymeric hydrophobic bacteriostatic porous element, comprising a plurality of pores and having an upstream surface and a downstream surface, the downstream surface facing the inner face of the bottom wall, more preferably, wherein the pores in the hydrophobic porous disc are effectively offset from the opening(s) in the outlet port.

In another embodiment, an outlet is provided for a point of use shower or a faucet, the shower or faucet including an attachment head, and a sterilizing grade water filter device comprising a porous sterilizing grade water filter, a water effluent portion, and a side wall having an external surface; the filter device being in fluid communication with, and removably connected to, the shower head or the faucet head, and the outlet; the outlet comprising: an outlet housing comprising a polymeric shell, preferably, a polymeric bacteriostatic shell, comprising a side wall having a side wall inner surface and a side wall outer surface, a bottom wall having an inner face, an outer face, and a plurality of outlet ports, each port comprising an opening allowing water flow from the inner face through the outer face, and a cavity defined by the side wall inner surface and the bottom wall inner face, wherein both the side wall outer surface and the bottom wall outer face contact environmental air surrounding the shower head or the faucet head, and; a hydrophobic porous disc (preferably, a hydrophobic bacteriostatic porous disc) contained in the cavity of the polymeric shell, the hydrophobic porous disc comprising a plurality of pores and having an upstream surface and a downstream surface, the downstream surface facing the inner face of the bottom wall, preferably wherein the pores in the hydrophobic porous disc are effectively offset from the outlet ports; and, wherein the side wall inner surface of the shell includes a mounting element releasably engageable with the external surface of the side wall of the filter device, the outlet cavity being suitable for receiving at least a portion of the filter device. Preferably, the mounting element comprises threads.

In yet another embodiment, an outlet is provided for a point of use shower or a faucet, the shower or faucet including an attachment head, and a sterilizing grade water filter device comprising a porous sterilizing grade water filter, a water effluent portion, and a side wall having an external surface; the filter device being in fluid communication with, and removably connected to, the shower head or the faucet head, and the outlet; the outlet comprising an outlet housing comprising a polymeric shell comprising a side wall having a side wall inner surface and a side wall outer surface, a bottom wall having an inner face, an outer face, and a plurality of outlet ports, each port comprising an opening allowing water flow from the inner face through the outer face, and a cavity defined by the side wall inner surface and the bottom wall inner face, wherein both the side wall outer surface and the bottom wall outer face contact environmental air surrounding the shower head or the faucet head; and, wherein the side wall inner surface of the shell includes a mounting element releasably engageable with the external surface of the side wall of the filter device, the outlet cavity being suitable for receiving at least a portion of the filter device. Preferably, the mounting element comprises threads.

A filter device according to an embodiment of the invention, which is also suitable for use with faucet tap systems and shower systems, comprises a porous water sterilizing filter and a housing containing the filter. The filter device is removably connectable (e.g., via one or more fittings and/or seals) to a faucet tap head or a shower head, and the removable outlet is removably connectable to the filter device; more preferably, the removable outlet is removably connectable via threads on the outlet housing to threads on the filter device housing. In one illustrative embodiment, the porous water sterilizing filter housing comprises a bottom wall having an outer edge, a side wall having an internal surface and the external surface comprising threads, and a water effluent portion, wherein the water effluent portion is between the outer edge of the bottom wall, and the internal surface of the side wall. In another illustrative embodiment, the bottom wall includes the water effluent portion (e.g., ports in the bottom wall).

In another embodiment, an outlet and water filter device for a point of use faucet or a point of use shower is provided comprising an embodiment of the outlet, and, a sterilizing grade water filter device comprising a porous sterilizing grade water filter, a water effluent portion, and a side wall having an external surface comprising threads; wherein the side wall inner surface of the shell includes threads releasably engageable with the threads on the external surface of the side wall of the filter device, the outlet cavity receiving at least a portion of the filter device. In one embodiment of the outlet and water filter device, the sterilizing grade water filter device comprises a housing comprising a bottom wall having an outer edge, the side wall having an internal surface and the external surface comprising threads, and the water effluent portion, wherein the water effluent portion is between the outer edge of the bottom wall, and the internal surface of the side wall. In another embodiment of the outlet and water filter device, the sterilizing grade water filter device comprises a housing comprising a bottom wall comprising the water effluent portion, and the side wall having the external surface comprising threads.

An embodiment of a water sterilizing filter device provided by the invention comprises a porous water sterilizing filter comprising at least one porous element; and a housing containing the filter and providing a fluid flow path through the filter, the housing comprising an inlet and a water effluent portion and defining the fluid flow path between the inlet and the water effluent portion, wherein the housing comprises a bottom wall having an outer edge, a side wall having an internal surface and the external surface comprising threads, and the water effluent portion, wherein the water effluent portion is between the outer edge of the bottom wall, and the internal surface of the side wall.

Yet another embodiment of a water sterilizing filter device comprises a porous water sterilizing filter comprising at least one porous element; and, a housing containing the filter and providing a fluid flow path through the filter, the housing comprising an inlet and a water effluent portion and defining the fluid flow path between the inlet and the water effluent portion, wherein the housing comprises a bottom wall comprising the water effluent portion, and a side wall having the external surface comprising threads.

In yet another embodiment, a system is provided, comprising an outlet, a porous water sterilizing filter device, and a faucet tap head or a shower head. In one embodiment of the system, the system further comprises a safety retainer for releasably locking the filter device to the shower attachment head or the tap attachment head, the safety retainer comprising a handle and a pin, wherein the pin engages with a safety retainer receptacle; wherein the shower attachment head or the tap attachment head further comprises the handle and pin; and, the filter device housing comprises the safety retainer receptacle. Alternatively, or additionally, in an embodiment of the system, the shower attachment head or the tap attachment head further comprises a display for notifying the user as to when the filter device and or outlet was installed and/or for notifying the user as to when the filter device and/or outlet should be replaced.

If desired, at least one electronic display reflecting, for example, one or more of any of the following: the installation date, period of time of use, and/or lifetime of the outlet and/or filter, water temperature, water flow rate, can be provided, preferably wherein the display is mounted on or in the faucet tap head or shower head, and the display provides a notification as to when the outlet and/or filter should be replaced. Advantageously, if desired, an organization or institution (such as a hospital) using a plurality of outlets and filters can track these items, e.g., for inventory purposes and/or for replacing the items at the appropriate date. For example, barcodes and scanners can be used with software, and if desired, interfaced with, illustratively, an electronic data system over the internet.

A method according to an embodiment of the invention comprises passing water through the filter device and the outlet.

In another embodiment, a method for reducing retrograde contamination comprises engaging a removable outlet with a point of use shower or faucet including a water filter device, wherein engaging the outlet includes providing a hermetic seal between the outlet and the filter device, and also includes providing a tight seal, preferably a hermetic seal, between the outlet and the shower attachment head or faucet attachment head. Typically, the method includes dispensing water through the shower or faucet and through the filter device and outlet. In some embodiments, the method includes monitoring the time of use of the outlet and/or filter, and replacing the outlet and/or filter, e.g., after a target period of time has been reached or when contamination is suspected or known to have occurred.

An embodiment of the invention also provides a method for dispensing water, comprising water through the porous water sterilizing filter device, and the removable outlet. In another embodiment, a method for reducing retrograde contamination comprises removing the outlet from the porous water sterilizing filter device, and replacing the outlet. In yet another embodiment, a method for reducing retrograde contamination comprises connecting a removable outlet to the porous water sterilizing filter device.

Each of the components of the invention will now be described in more detail below, wherein like components have like reference numbers.

System

Figure 1A:
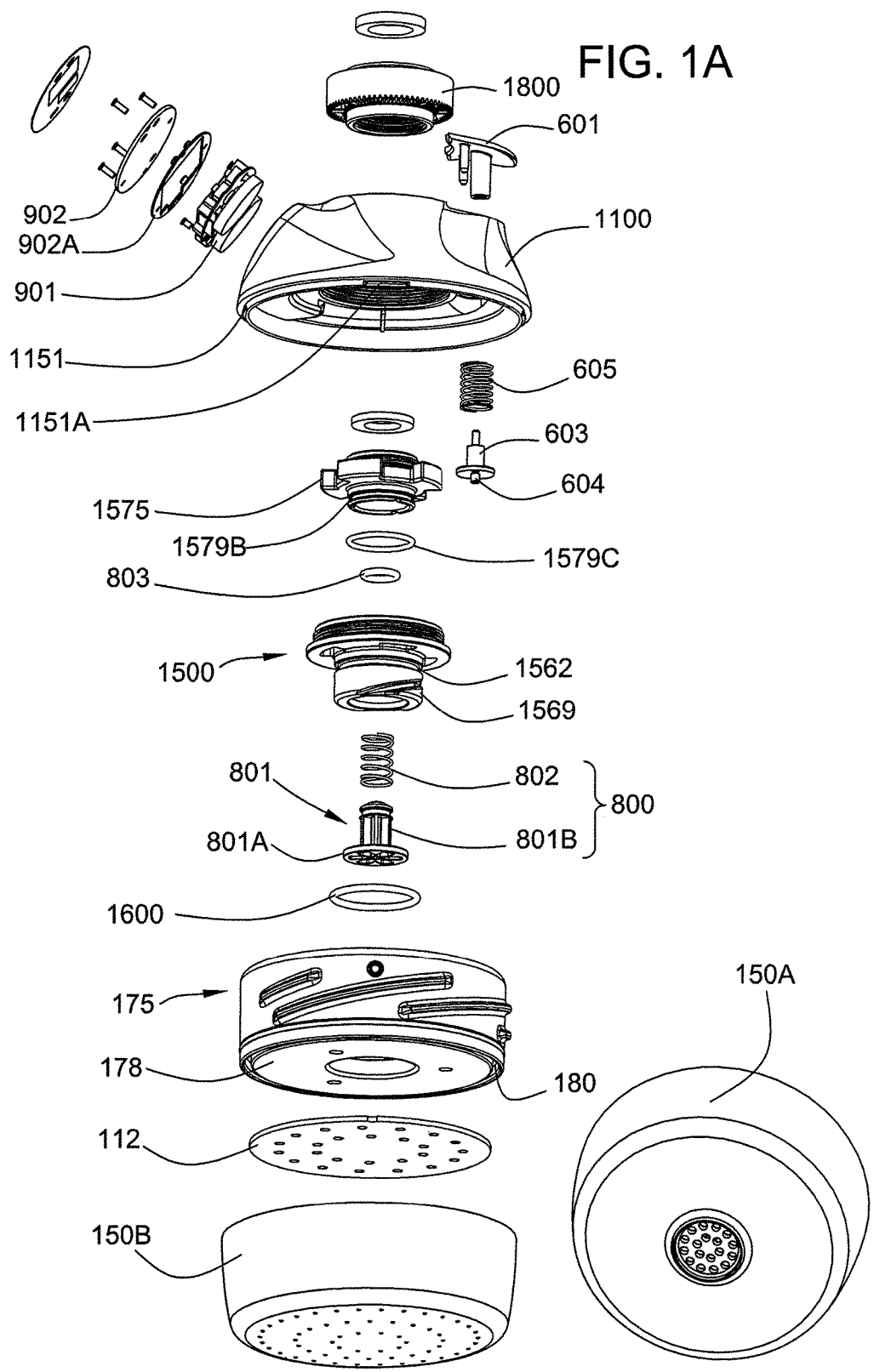
FIG. 1C is a cross-sectional view of the faucet head system shown in FIGS. 1A and 1B, after assembly, also showing, in enlarged views, a tight seal between the outlet and the faucet attachment head, and a hermetic seal between the outlet and the filter device.
Figure 1B:
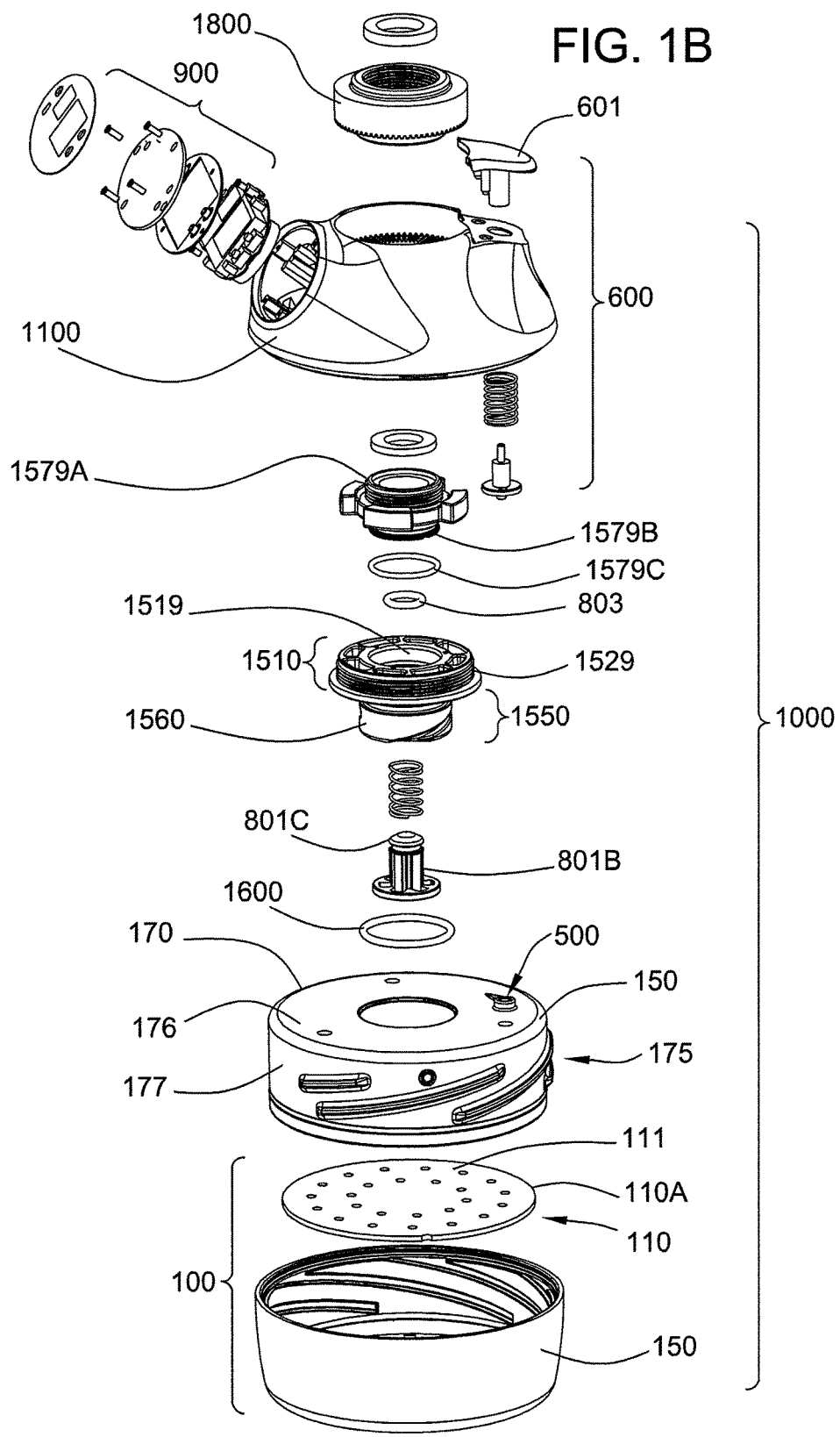
Figure 1C:
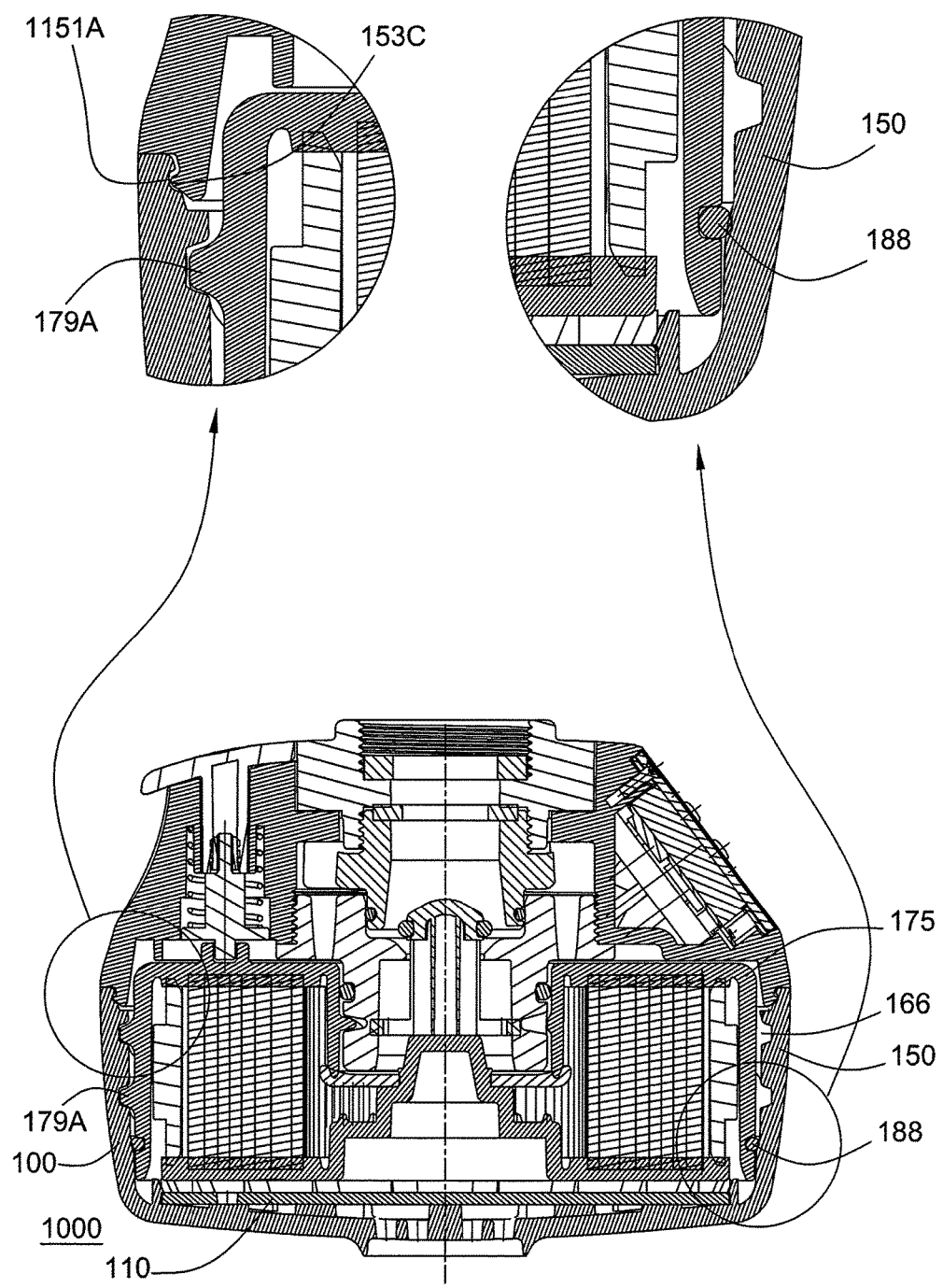

FIG. 1 shows an embodiment of a faucet tap system 1000 comprising a faucet tap attachment head 1100; a filter device 170 comprising a filter device housing 175 including a top wall 176, a side wall 177, and a bottom wall 178; and an outlet 100 comprising an outlet housing 150 (suitable for receiving at least a portion of the filter device) and a hydrophobic (preferably bacteriostatic) porous disc 110 comprising a hydrophobic (preferably bacteriostatic) porous element 110A having an upstream surface 111 and a downstream surface 112. The filter device 175 is removably connectable to the tap attachment head 1100, and the illustrated outlet 100 is removably connectable to the filter device. FIG. 1C shows, in cross-sectional view, the assembled tap system 1000, wherein filter device 170 is connected to the tap attachment head 1100, with the outlet 100 connected to the filter device and the head. As shown in FIG. 1A, the outlet housing can comprise a jet outlet 150A or a shower outlet 150B, respectively. The illustrated embodiment of the system also includes a safety retainer arrangement comprising a safety retainer 600 that engages with a safety retainer receptacle 500.

Figure 2A:
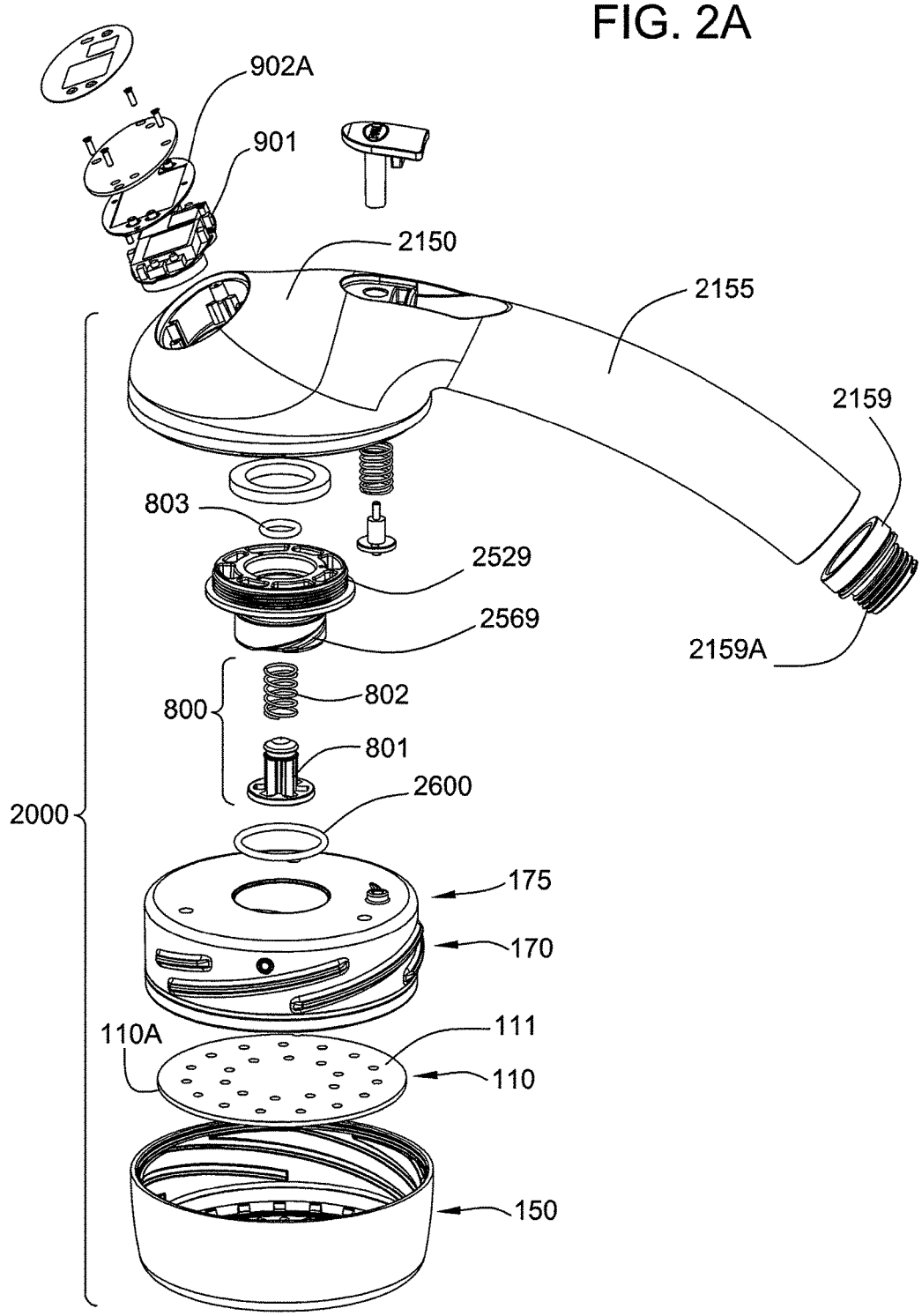
FIGS. 2A and 2B show exploded views showing an embodiment of a shower head system, as well as embodiments of components of the shower head system, according to the invention, comprising a shower head (illustrated with an electronic display), a filter device, and an outlet comprising an outlet housing (illustrated as a shower housing in FIG. 2B) and an outlet disc element.
Figure 2B:
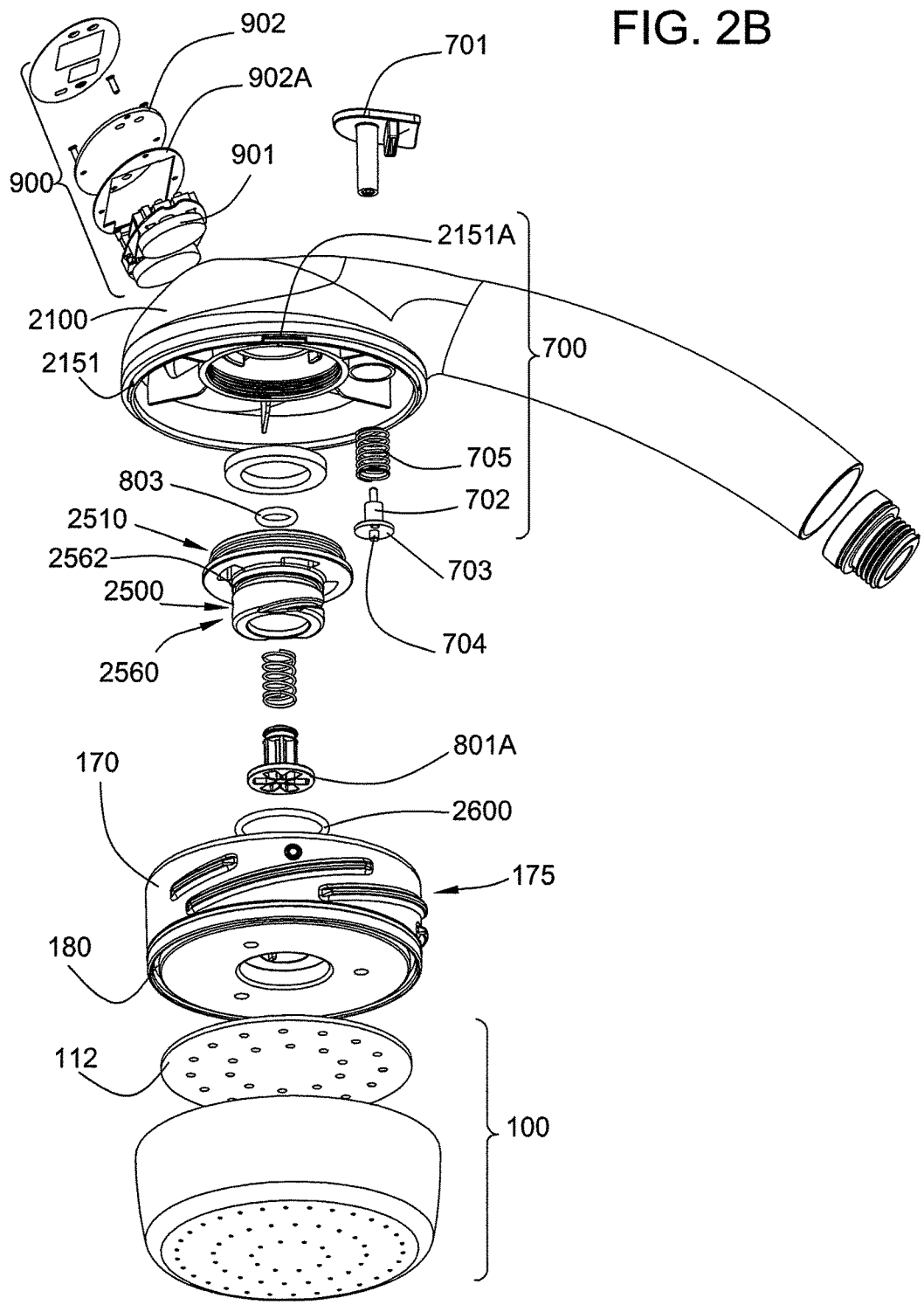

FIG. 2 shows an embodiment of a shower head system 2000 comprising a shower attachment head 2100; a filter device 170 comprising a filter device housing 175 including a top wall 176, a side wall 177, and a bottom wall 178; and an outlet 100 comprising an outlet housing 150 (suitable for receiving at least a portion of the filter device) and a hydrophobic (preferably bacteriostatic) porous disc 110 comprising a hydrophobic (preferably bacteriostatic) porous element 110A having an upstream surface 111 and a downstream surface 112. The filter device 170 is removably connectable to the shower attachment head 2100, and the illustrated outlet 100 is removably connectable to the filter device. The illustrated embodiment of the system also includes a safety retainer arrangement comprising a safety retainer 700 that engages with a safety retainer receptacle 500.

FIG. 9 shows an embodiment of a faucet tap system 1000' comprising a faucet tap attachment head 1100; a filter device 170 comprising a filter device housing 175' including a top wall 176, a side wall 177, and a bottom wall 178; and an outlet 100 comprising an outlet housing 150 (suitable for receiving at least a portion of the filter device) and a hydrophobic (preferably bacteriostatic) porous disc 110' comprising a hydrophobic (preferably bacteriostatic) porous element 110A having an upstream surface 111 and a downstream surface 112, wherein the disc further comprises a sealing ring 110C. The filter device 170 is removably connectable to the tap attachment head 1100, and the illustrated outlet 100 is removably connectable to the filter device. FIG. 9C shows, in cross-sectional view, the assembled tap system 1000', wherein filter device 170 is connected to the tap attachment head 1100, with the outlet 100 connected to the filter device and the head. As shown in FIG. 9A, the outlet housing can comprise a jet outlet 150A or a shower outlet 150B, respectively. The illustrated embodiment of the system also includes a safety retainer arrangement comprising a safety retainer 600 that engages with a safety retainer receptacle 500.

FIG. 11 shows an embodiment of a shower head system 2000' comprising a shower attachment head 2100; a filter device 170 comprising a filter device housing 175' including a top wall 176, a side wall 177, and a bottom wall 178; and an outlet 100 comprising an outlet housing 150 (suitable for receiving at least a portion of the filter device) and a hydrophobic (preferably bacteriostatic) porous disc 110' comprising a hydrophobic (preferably bacteriostatic) porous element 110A having an upstream surface 111 and a downstream surface 112, wherein the disc further comprises a sealing ring 110C. The filter device 170 is removably connectable to the shower attachment head 2100, and the illustrated outlet 100 is removably connectable to the filter device. The illustrated embodiment of the system also includes a safety retainer arrangement comprising a safety retainer 700 that engages with a safety retainer receptacle 500.

As will be described in more detail below, once the system is assembled (FIGS. 1C and 9C show assembled systems 1000 and 1000' respectively, assembled systems 2000 and 2000' not shown), at least a portion of the filter device 170 fits, along with the hydrophobic porous disc 110 (shown in FIG. 1C), 110' (shown in FIG. 9C) within the outlet housing 150, wherein the upstream surface 111 of the hydrophobic porous element is spaced away from the bottom wall 178 of the device housing 175 (shown in FIG. 1C), 175' (shown in FIG. 9C) (typically, the space between the upstream surface 111 and element-facing surface of the bottom wall 178 is in the range of from about 1 mm to about 2 mm), and wherein the outlet 100 is removably connected to the filter device 170. Preferably, after the filter device is engaged with the faucet tap attachment head (1100) or shower attachment head (2100), fully engaging the outlet with the filter device provides a hermetic (air- and watertight) seal between the outlet and the filter device.

If desired, as, or after, the filter device is fully engaged with the tap or shower head, a tight, but not necessarily hermetic, seal can be provided between the outlet and the faucet tap head or the shower head. Preferably, however, this seal between the outlet and the faucet tap attachment head or the shower attachment head is hermetic.

Subsequently, the outlet can be easily replaced when desired without replacing the filter device, as the filter device has an extended life compared to the outlet. The filter device can also be easily replaced when desired, typically, without replacing the faucet tap attachment head or the shower attachment head.

Outlet

Outlet Housing

FIGS. 3 and 10 show various views of embodiments of the outlet 100 and the outlet housing 150, the illustrated embodiment comprising a shower outlet housing 150B and a polymeric, hydrophobic (preferably polymeric hydrophobic, bacteriostatic) porous disc 110, 110' (disc 110 shown in FIG. 3, disc 110' shown in FIG. 10). The housings 150 illustrated in FIGS. 3 and 10 each comprise a polymeric shell 151 (preferably, the polymeric shell is bacteriostatic), comprising a side wall 152 having a side wall inner surface 153 and a side wall outer surface 154, a bottom wall 155 having an inner face 156, an outer face 157, and a plurality of outlet ports 158 each port comprising one or more openings 158A allowing water flow from the inner face through the outer face, and a cavity 159 defined by the side wall inner surface and the bottom wall inner face. Typically, the outlet housing has an inner diameter generally corresponding to, or slightly greater than, the outer diameter of the hydrophobic porous disc 110, 110' (110' further comprising sealing ring 110C), and the outlet housing has an inner diameter generally corresponding to the outer diameter of the filter device, and the cavity is suitable for receiving at least a portion of the filter device 170; preferably, the cavity is suitable for receiving substantially the entire height and/or length of the device.

In some embodiments, the outlet housing includes one or more structures for, for example, one or more of any of the following: engaging the hydrophobic porous element, removably engaging other components of the system, improving sealing, and/or providing spacing.

In accordance with the embodiment illustrated in FIG. 3, the housing includes a retainer 160 (illustrated in FIG. 3D as a plurality of clips 160A, each including a notch) for engaging the side edge 113 of the hydrophobic bacteriostatic porous disc 110, and a mounting element 165 (illustrated as threads 166) for removably engaging the filter device 170, preferably, wherein a hermetic seal is provided between the shell and the outer surface of the filter device side wall when the shell and filter device are fully engaged.

In accordance with the embodiment illustrated in FIG. 9, the hydrophobic porous disc 110' further includes a sealing ring 110C around the edge of the disc and attached thereto, fitting tightly against the junction of the side wall inner surface 153 and the bottom wall inner face 156, and the housing includes a mounting element 165 (illustrated as threads 166) for removably engaging the filter device 170, preferably, wherein a hermetic seal is provided between the shell and the bottom and/or outer surface of the filter device side wall when the shell and filter device are fully engaged.

Moreover, in accordance with the illustrated embodiments shown in FIGS. 3C and 10C, the outlet housings each includes an annular ridge 153A on the inner surface 153, wherein the top surface of the ridge, and the portion 153B of the inner surface 153 bounded by the ridge (preferably, a groove 153C), preferably also provides a seal between the shell and an annular portion of the outer surface of the faucet tap or shower head side wall when the shell and head are engaged. Illustratively, using FIGS. 1-3 and 9-11 for reference (and as shown in more detail in FIGS. 1C and 9C), as or after the filter device is fully engaged with the faucet tap head or shower head, and the outlet is fully engaged with the filter device, a hermetic seal is preferably provided between the outlet and the filter device, and a seal (that is preferably, but not necessarily, hermetic) is provided between the outlet and the faucet tap head or the shower head.

As shown in FIGS. 1A, 1B, 9A, and 9B, the hydrophobic porous disc 110, 110' (FIGS. 1A and 1B show disc 110, FIGS. 9A and 9B show disc 110') comprising hydrophobic porous element 110A has an upstream surface 111 and a downstream surface 112, and in accordance with the housing embodiments shown in FIGS. 3A, and 10A, the inner face 156 of the bottom wall 155 further comprises a spacer 155A (shown as a plurality of upward projections 155B; preferably, wherein the projections in the center are taller than those nearer the side wall inner surface; more preferably, wherein the projections slope downwardly from the center toward the side wall) suitable for contacting the downstream surface 112 and preventing portions of the downstream surface 112 from contacting a major portion of inner face of the bottom wall.

The outlet housing can be fabricated, as is known in the art, from any suitable impervious material, including any impervious thermoplastic material, which is compatible with water. For example, the housing can be fabricated from a polymer such as an acrylic, nylon, polypropylene, polystyrene, polyester (e.g., polyethylene, including low density polyethylene (LDPE)), or a polycarbonated resin.

Preferably, the housing includes at least one bacteriostatic agent comprising, for example, silver or copper. A formed housing can be treated (e.g., by coating) to include the agent, or the housing can be formed with the agent therein and/or thereon. Preferably, the disc is be formed with bacteriostatic particles therein.

Porous Disc

The hydrophobic porous disc 110, 110' comprises at least one hydrophobic porous element 110A, having pores 110B. The pores 110B can be in a variety of locations in the disc. For example, they can be arranged in predetermined locations in the element(s) (e.g, the pores (illustratively, macropores having diameters in the range of from about 0.5 mm to about 3 mm) can be provided via molding), or the locations are not specifically predetermined. Preferably, the pores in the hydrophobic porous disc are effectively offset from the opening(s) in the outlet port. For example, using FIGS. 3C, 3D, 10C, and 10D for reference, the pores 110B can be in predetermined locations in the element, and when the element is retained in the shell, the pores are vertically offset from the outlet port openings. Alternatively, for example, the pores are microporous and are so small and numerous that at least the majority are offset from the outlet port openings and/or the pores provide such tortuous flow paths (e.g., the disc material can have a structure similar to that of a sponge) so that they are effectively offset from the outlet port openings. Thus, in some embodiments including a hydrophobic porous disc, when the outlet is engaged with the faucet tap head or the shower head, and the filter device, a predominantly non-linear flow path is defined from the water effluent portion of the filter device through the disc and through the outlet ports.

The disc and element(s) can have any suitable pore structure, e.g., a pore size (for example, as evidenced by bubble point, or by $K_L$ as described in, for example, U.S. Pat. No. 4,340,479, or evidenced by capillary condensation flow porometry), a pore rating, or a pore diameter (e.g., when characterized using the modified OSU F2 test as described in, for example, U.S. Pat. No. 4,925,572). Typically, the porous disc has a mean pore size in the range of from about 10 microns to about 150 microns, preferably, in the range of from about 50 microns to about 100 microns. In those embodiments wherein the porous disc is a mesh screen (e.g., lock-woven polyester), the mesh typically has a porosity in the range of from about 20 microns to about 100 microns.

Preferably, the disc includes at least one bacteriostatic agent comprising, for example, silver and/or copper. A formed disc can be treated (e.g., by coating) to include the agent, or the disc can be formed with the agent therein and/or thereon. Illustratively, the disc can be formed with bacteriostatic particles therein.

A variety of materials, preferably, polymeric materials, are suitable for providing the disc and element(s), and they can be produced as is known in the art. For example, polypropylene and polyethylene can be molded, sintered, or lock-woven to provide a disc and element having macropores and/or micropores.

A variety of materials, preferably elastomeric polymeric materials, more preferably, thermoplastic elastomers (TPEs) (e.g., having a Shore A hardness in the range of, for example about 25 to about 70), are suitable for providing the sealing ring, and they can be produced and attached to the disc and element(s) as is known in the art. Preferably, the sealing ring is attached to the disc as an overmold or via two-shot molding.

Filter Device

A filter device according to an embodiment of the invention comprises a housing and a porous water filter, preferably, a sterilizing grade water filter, wherein the filter is disposed in the housing across the fluid flow path through the device. Preferably, the filter device is removably connectable (e.g., via one or more fittings and/or seals, more preferably, via threads) to a faucet tap head or a shower head, and the removable outlet is removably connectable to the filter device; more preferably, the removable outlet is removably connectable (e.g., via threads) to the filter device housing. FIGS. 4A and 4B show exploded views of an embodiment of a filter device 170 comprising a porous sterilizing filter 190 (illustrated as a pleated filter) in a filter device housing 175, 175' and FIG. 8 shows various views (including an exploded view) of another embodiment of a filter device 170 comprising a porous sterilizing filter 190' (illustrated as a hollow fiber membrane filter) in a filter device housing 175 (embodiment of a filter device 170 comprising a porous sterilizing filter 190' in a filter device housing 175' not shown).

Porous Sterilizing Water Filter

The porous sterilizing water filter can comprise one or more porous membranes and/or one or more porous fibrous elements. In some embodiments, the water filter includes a plurality of porous elements, wherein each element can comprise one or more porous membranes and/or one or more porous fibrous elements.

With respect to FIGS. 4A and 4B, the illustrated porous sterilizing grade water filter 190 (illustrated as a hollow pleated filter) comprises a porous filter element (preferably, a microporous membrane) 191A, and an outer cage 195 protecting and/or supporting the filter. Typically, the filter also has support and/or drainage layers (e.g., non-woven, preferably hydrophobic materials such as Reemay®) upstream and/or downstream of the filter element(s). Preferably, the water filter includes an upstream support and/or drainage layer, two or more porous membranes, and a downstream support and/or drainage layer.

With respect to FIG. 8, the illustrated porous sterilizing grade water filter 190' (illustrated as a hollow fiber filter) comprises a plurality of porous (preferably, microporous) hollow fiber membranes 191A'. Preferably, the hollow fibers have a pore rating of about 0.2 microns or less, in some embodiments, about 0.1 microns or less (e.g., in the nanometer range).

In accordance with the embodiment illustrated in FIG. 8, the hollow fibers are immobilized in a potting resin 300. Suitable potting resins and methods of immobilization are known in the art.

Membranes can have a symmetric or an asymmetric pore structure. Preferably, in those embodiments wherein the water filter comprises a plurality of non-hollow fiber membranes, at least one membrane has an asymmetric pore structure, wherein the upstream surface of the membrane (the first surface contacted by the water) has a more open portion of the pore, and the downstream surface (or a portion between the upstream and downstream surfaces) has a more narrow portion of the pore. In some embodiments wherein the water filter comprises a plurality of hollow fiber membranes, the membranes have an asymmetric pore structure, wherein the upstream surfaces (the first surface contacted by the water) have a more open portion of the pore, and the downstream surfaces (or a portion between the upstream and downstream surfaces) have a more narrow portion of the pore.

The filter, membrane(s) and/or fibrous element(s) can have any suitable pore structure, e.g., a pore size (for example, as evidenced by bubble point, or by $K_L$ as described in, for example, U.S. Pat. No. 4,340,479, or evidenced by capillary condensation flow porometry), a pore rating, or a pore diameter (e.g., when characterized using the modified OSU F2 test as described in, for example, U.S. Pat. No. 4,925,572), or by removing a defined microbial challenge with a defined organism under defined challenge conditions, e.g., as described in, for example HIMA (Health Industry Manufacturers Association, now Advanced Medical Technology Association (AdvaMed)) and/or ASTM documents, such as ASTM F838-83 (1983; now ASTM F83-05 (2005): "Standard Test Method for Determining Bacterial Retention of Membranes Utilized for Liquid Filtration"). Typically, the porous filter is a sterilizing grade rated filter, preferably having, a pore rating of about 0.2 microns or less, in some embodiments, about 0.1 microns or less (e.g., in the nanometer range).

A variety of materials, preferably, polymeric materials, are suitable for providing the filter and filter element(s), and they can be produced as is known in the art. In those embodiments wherein the filter is pleated, the filter can be pleated as is known in the art, including, for example, as described in U.S. Pat. No. 5,543,047.

Filter Device Housing

In accordance with the embodiments illustrated in FIGS. 4A, 4B, and 5, the illustrated filter device housings 175, 175' (FIGS. 4A and 5 show housing 175; FIG. 4B shows housing 175') each comprise a top wall 176 including a device inlet 176A, a side wall 177 having a side wall inner surface 177A and a side wall outer surface 177B, a bottom wall 178, and a device outlet or water effluent portion 180, illustrated in FIG. 5 as an annulus between the outer edge 178A of the bottom wall 178 and the side wall inner surface 177A.

In accordance with the embodiment illustrated in FIG. 8, the illustrated filter device housing 175 (housing 175' not shown) comprises a top wall 176 including a device inlet 176A, a side wall 177 having a side wall inner surface 177A and a side wall outer surface 177B, a bottom wall 178', and a device outlet or water effluent portion 180', illustrated as a plurality of ports 181 each port comprising one or more openings 181A in the bottom wall 178'. In this illustrated embodiment, the housing also includes a central tubular wall 182 including a plurality of flow distribution ports 182A.

In accordance with the embodiment illustrated in FIGS. 4A, 4B, and 5, the filter devices provide for "inside/out" flow, wherein the water passes from the hollow portion of the filter though the filter elements and the cage, and through the water effluent portion. In some embodiments, the inside/out flow and the annulus between the outer edge of the bottom wall and the side wall inner surface provides efficient directed flow while flushing the various surfaces.

In accordance with the embodiment illustrated in FIG. 8, the filter device provides for "outside/in" flow, wherein the water passes from the outside of the fibers into hollow portion of the fibers, and through the water effluent portion of the housing.

In a preferred embodiment, the filter device includes one or more structures for, for example, one or more of any of the following: removably engaging other components of the system, improving sealing, and/or providing spacing.

For example, in the illustrated embodiments of the devices shown in FIGS. 4A, 4B, and 5, and in FIG. 8, the side wall outer surface 177B of the device housing includes an outer mounting element 179 (illustrated as comprising threads 179A) for removably engaging the outlet 100, and an inner mounting element 189 (illustrated as comprising threads 189A) for removably engaging the faucet tap head 1100 or the shower head 2100.

The illustrated device housing 175 side wall outer surface shown in FIGS. 4A and 5 also includes a groove 187, and the device further comprises an o-ring 188 in the groove, providing for an improved seal between the filter device housing and the outlet housing when the two housings are fully engaged.

The illustrated device housing 175' side wall outer surface shown in FIG. 4B does not include a groove, and the illustrated device does not include an o-ring. As described in the "Outlet Housing" section above, the sealing ring 110C around the circumference of the hydrophobic porous disc 110', fitting tightly against the junction of the side wall inner surface 153 and the bottom wall inner face 156, contacts the bottom and/or outer surface of the filter device side wall, preferably providing a hermetic seal between the filter device housing and the outlet housing when the two housings are fully engaged.

In yet another alternative (not shown), the outer surface (e.g., the groove which accepts the o-ring 188) can include, in place of the o-ring, a protruding lip (e.g., a polymeric and/or elastomeric lip) engaging with an elastomeric area on the outlet to provide the hermetic seal.

The embodiments of the devices illustrated in FIGS. 4A, 4B, and 5, further comprise an optional valve 200 comprising a projection 201 comprising a ridge 202, shoulders 203 and 204, pins 205, and a non-return gasket 210. The embodiment of the device illustrated in FIG. 8 also further comprises an optional valve 200 comprising a projection 201 (non-return gasket 210 not shown). In these illustrated embodiments, the projection is part of the bottom wall 178 or 178'. The use of the valve can be desirable for preventing back flow of contaminated water from the filter device into the water system and/or for protecting the user from contaminated water on the upstream side of the filter when changing the used filter. In those embodiments including the valve, the non-return gasket comprises a non-porous resilient material or flap fitting over the tip of the projection (via an opening in the gasket) and contacting the ridge 202 and/or projection 201. When there is no (or insufficient) water pressure, the gasket closes off the inlet 176A of the device (e.g., by sealing against the inner surface of the top wall 176). When water pressure is present, the flap is pushed away from the inner surface of the top wall, e.g., so that the downstream surface of the flap contacts shoulder 202 and/or 203, opening the inlet 176A and allowing water to flow through the device. A variety of materials, preferably elastomeric materials, are suitable for providing the valve and gasket, and are known in the art.

In some embodiments, e.g., wherein the water to be filtered is highly aerated and/or contains bubbles, the filter device includes at least one vent, e.g., to reduce or prevent blinding of the filter. For example, in one embodiment, as shown in FIG. 6A, wherein the shoulder 204 includes a plurality of openings 204A, the openings are covered by at least one porous (preferably, microporous) hydrophobic membrane 206, wherein the membrane is retained by bracket 207, containing bracket openings 207A. Thus, the filter device includes a plurality of vents 250, allowing air or gas (but not water) to pass through openings 204A, the membrane 206, and bracket openings 207A.

In another illustrative embodiment including a vent, as shown in FIG. 6B, the projection 201 includes a central opening 201A, and at least one porous (preferably, microporous) hydrophobic membrane 215 in the opening. In the illustrated embodiment, the membrane is interposed between an upstream support layer 215A (e.g., a non-woven, preferably hydrophobic material, such as Reemay®) and a downstream drainage layer 215B (e.g., a non-woven, preferably hydrophobic material, such as Reemay®), which are assembled together and retained in the projection 201 and covering the opening 201A. Thus, the filter device includes a vent 275, allowing air or gas (but not water) to pass through the support layer 215A, the membrane 215, the drainage layer 215B, and the opening 201A.

In those embodiments including a vent, at least one membrane is a hydrophobic membrane, either inherently hydrophobic, or treated to provide hydrophobicity. Such membranes are known in the art.

Preferably, the filter device further comprises a safety retainer receptacle for lockably engaging the filter device with the faucet tap attachment head or the shower attachment head, wherein the lock can be disengaged when desired.

For example, using FIGS. 5 and 8 for reference, the illustrated filter device housing includes a safety retainer receptacle 500, comprising a collar 501, and a depression 501A, for engaging with a safety retainer associated with the faucet tap head or the shower head, the safety retainer receptacle preferably further comprising an upwardly sloping step 502 connected to the collar.

As shown in FIGS. 1 and 9, the illustrated faucet tap attachment head 1100 includes a safety retainer 600 comprising a handle or lever 601, a shaft 602, a base 603 and a pin 604, wherein a spring 605 is arranged on the shaft between the base and the handle. As the device 170 engages with the head 1100, the tip of the spring loaded pin 604 follows the upwardly sloping step 502 (FIGS. 4A and 4B) until the pin is retained in the depression 501A, locking the engagement between the device and the head, and in the desired orientation with the head and subsequently the outlet. The device can be released from the head when desired, upon lifting handle 601, thus disengaging the pin from the depression, followed by rotating the device so that the inner threads 189A disengage from the threads 1569 on the faucet tap head.

Similarly, using FIGS. 2 and 11 for reference, the illustrated shower head 2100 includes a safety retainer 700 comprising a handle or lever 701, a shaft 702, a base 703 and a pin 704, wherein a spring 705 is arranged on the shaft between the base and the handle, allowing the filter device to be lockably engaged and disengaged with the shower head as described above with respect to the faucet tap head.

The device housing, cage, and valve, and other components can be fabricated, as is known in the art, from any suitable impervious material, including any impervious thermoplastic material, which is compatible with water. For example, each of these components can be fabricated from one or more polymers such as an acrylic, nylon polypropylene, polystyrene, polyester, polyethylene, or a polycarbonated resin.

As with the outlet housing, the device housing, cage, and/or other components, can be treated (e.g., by coating) or formed to include a bacteriostatic agent.

Faucet Tap Attachment Head and Shower Attachment Head

Faucet Tap Attachment Head

The illustrated embodiment of the faucet tap attachment head 1100 comprises a body 1150, including a shoulder 1151 (illustrated as an annular shoulder), and one or more tabs 1151A, and a hollow connector 1500. In the illustrated embodiment the connector 1500 includes an upper portion 1510 (including an internal thread 1519, e.g., for connection to a locknut 1575; and an external thread 1529 for connection to the body 1150) and a lower portion 1550, including an annular extension 1560, comprising a groove 1562 and an external thread 1569. In the illustrated embodiment, the attachment head includes an o-ring 1600 in the groove 1562 of the connector.

Optionally, the faucet tap attachment head can further comprise (e.g., at an upper portion of the head) a vent, e.g., including an opening and at least one porous (preferably microporous) hydrophobic membrane covering the opening, the membrane allowing air or gas, but not water, to pass from the interior of the head to the exterior of the head. In some applications, e.g., wherein the water pressure is low, a vent is desirable for allowing systemic air from the water supply system to pass through the vent.

In some embodiments, the internal thread of the connector can be suitable for connection to a water source, e.g., via another connector and/or a pipe or tube. In the illustrated embodiment, the faucet tap head 1100 further comprises a hollow locknut 1575, illustrated as comprising an upper external thread 1579A (for connection to a tap joiner 1800, wherein a resilient seal such as a washer or o-ring is interposed between the tap joiner and the locknut) and a lower projection including groove 1579B for accepting o-ring 1579C (for resiliently sealing against internal surface 1519 of the connector).

FIGS. 1 and 9 show an illustrative tap joiner, e.g., with an internal thread suitable for connection to the locknut, and an internal thread for connection to a water source (also showing a resilient seal such as a washer or o-ring that can be interposed between the tap joiner and the water source), e.g., via another connector and/or a pipe or tube. A variety of tap joiners can be used in accordance with the invention, e.g., with internal threads suitable for connection to the locknut, and internal or external threads for connection to a water source. Alternatively, or additionally, tap joiners can have other connections such as CPC connectors. Different tap joiners may be suitable for different localities and/or markets. In some embodiments, the faucet tap head is provided without a tap joiner. Typically, however, the head is provided with a joiner suitable for a location and/or market.

Shower Attachment Head

In FIGS. 2 and 11, the illustrated embodiments of the shower attachment head 2100 each comprise a body 2150, including a handle 2155, a shoulder 2151 (illustrated as an annular shoulder), and one or more tabs 2151A, and a hollow connector 2500. In the illustrated embodiments the connector 2500 includes an upper portion 2510 (including an external thread 2529 for connection to the body 2150, and a resilient seal such as a washer or o-ring that can be interposed between the connector and the body) and a lower portion 2550, including an annular extension 2560, comprising a groove 2562 and an external thread 2569. In the illustrated embodiment, the attachment head includes an o-ring 2600 in the groove 2562 of the connector, and the base of the handle 2155 includes a connector 2159 including an external thread 2159A, e.g., for connection to a water source, e.g., via another connector and/or a pipe or tube.

Optionally, as shown in FIG. 7, the shower attachment head can further comprise (e.g., at an upper portion of the head) a vent 1900, e.g., including a vent port 1905 and at least one porous (preferably microporous) hydrophobic vent membrane 1910 (that can comprise a supported membrane) covering the port, the membrane allowing air or gas upstream of the filter, but not water, to pass from the interior of the head to the exterior of the head. In some applications, e.g., wherein the water pressure is low, a vent is desirable for allowing systemic air or gas from the water supply system to pass through the vent. Preferably, the vent membrane has a pore rating that blocks the passage of bacteria therethrough. In accordance with the embodiment of a shower head including a vent shown in FIG. 7, the head includes a vent membrane seat 1915 for the vent membrane 1910 that covers vent port 1905, and a vent membrane support grid 1920 supporting (and in some embodiments, securing) the vent membrane in the head while venting.

As noted above, the filter device is removably engagable with the faucet tap attachment head or the shower attachment head. Thus, the external threads (1569, 2569) of the lower portion of the connector of the faucet tap attachment head or the shower attachment head (FIGS. 1, 2, 9, and 11), can be engaged with the inner threads 189A of the filter device housing (FIGS. 4A and 4B). Preferably, once the filter device is fully engaged with the attachment head, the o-ring (1600, 2600) in the groove in the connector provides for an improved seal between the filter device housing and the head.

Additionally, a seal is preferably provided between the body of the head and the inner surface of the outlet housing once the head and outlet housing are fully engaged (and the filter device is fully engaged with the head). Illustratively, as described above with respect to the outlet housing and using FIGS. 3 and 10 for reference, the illustrated outlet housings each include an annular ridge 153A on the inner surface 153, wherein the top surface of the ridge, and the portion 153B of the inner surface 153 bounded by the ridge (preferably, a groove 153C), preferably also provides a seal between the shell and the annular shoulder (1151, 2151) of the outer surface of the faucet tap or shower head side wall when the shell and head are engaged. Illustratively, using FIGS. 1-3 and 9-11 for reference (and as shown in more detail in FIGS. 1C and 9C respectively), as or after the filter device is fully engaged with the faucet tap attachment head or shower attachment head, and the outlet is fully engaged with the filter device, a seal is preferably provided between the outlet and the faucet tap head or the shower head. Optionally, the attachment head (1100, 2100) includes one or more tabs (1151A, 2151A) (or a continuous ridge (as shown in FIG. 9)), that fit(s) in the groove 153C of the outlet housing, to better retain the outlet housing and/or improve the seal between the outlet housing and the head.

The illustrated faucet tap attachment heads and the illustrated shower attachment heads each further comprise a flow control device, a safety retainer, and a display, discussed in more detail below.

Flow Control Device

Optionally, in some embodiments (e.g., as illustrated in FIGS. 1, 2, 9, and 11), the connector utilized with the faucet tap attachment head or the shower attachment head further comprises a flow control device 800, illustrated as a one-way valve comprising a valve body 801 (comprising a base 801A, a projection 801B (illustrated with a plurality of legs) and a groove 801C) and a spring 802 and a resilient gasket or o-ring 803 fitting in the groove 801C on the valve body. For example, in some embodiments, it is desirable to use a one-way valve (biased closed) to prevent water flow through the tap attachment head or shower attachment head when the filter device is not engaged with the head. Since water can become contaminated, e.g., due to contact with airborne contaminants, preventing such water flow can reduce contamination. Alternatively, or additionally, the user may prefer (or regulations may require) that the filter be present and engaged before water becomes available, so water is unable to flow until the filter is engaged. Subsequently, fully engaging the filter device with the head can open the valve, e.g., when the tip of the projection 201 on the bottom wall 178 of the filter device housing contacts the base 801A of the valve body and compresses the spring. The valve body can provide a desired level of flow resistance (e.g., by changing the diameter of the legs) to reduce water wastage, for example, in high flow and/or high pressure applications.

Safety Retainer

Also, as described above, the faucet tap head and the shower head preferably further comprise an optional safety retainer so that the filter device housing can be lockably engaged with the faucet tap head or the shower head, wherein the lock can be disengaged when desired, and reduce the risk of inadvertent removal of the filter device from the head.

Thus, as shown in FIGS. 1 and 9, the faucet tap head 1100 includes a safety retainer 600 mounted in the body comprising a handle or lever 601, a shaft 602, a base 603 and a pin 604, wherein a spring 605 is arranged on the shaft between the base and the handle, and the pin can be retained in the depression 501A of the filter device (FIGS. 4A, 4B, and 8), locking the engagement between the device and the head. The device can be released from the head when desired, upon lifting handle 601, thus disengaging the pin from the depression, followed by rotating the device so that the inner threads 189A disengage from the threads 1569 on the faucet tap head connector.

Similarly, using FIGS. 2 and 11 for reference, the shower head 2100 includes a safety retainer 700 mounted in the body comprising a handle or lever 701, a shaft 702, a base 703 and a pin 704, wherein a spring 705 is arranged on the shaft between the base and the handle, allowing the filter device to be lockably engaged and disengaged with the shower head as described above with respect to the faucet tap head.

The faucet tap attachment head and shower attachment head, and the various components (discussed in more detail below) can be fabricated, as is known in the art. For example, the faucet tap head, shower head, the connector, the locknut, and the valve body, can be fabricated from any suitable rigid impervious material, including any impervious thermoplastic material, which is compatible with water. For example, each of these components can be fabricated from a metal, metallic, and/or ceramic material, and/or from a polymer such as an acrylic, nylon, polypropylene, polystyrene, acrylonitrile butadiene styrene (ABS), polyester, polyethylene, a polycarbonated resin, or combinations thereof.

As with, for example, the outlet housing as discussed above, the faucet tap head and shower head and/or other components (e.g., the connector) can be treated (e.g., by coating and/or chroming) or formed to include a bacteriostatic agent.

Display

Optionally, but preferably, and as shown in FIGS. 1, 2, 9, and 11, the shower head or faucet tap head further comprises an electronic display 900, e.g., powered by one or more batteries and/or one or more solar cells.

The illustrated electronic display 900 includes a timer 901 (e.g., a timer module comprising one or more electronic timer units), and a securing panel 902. Preferably, and as illustrated, a sealing gasket 902A is interposed between the securing panel and the module.

If desired, the display can reflect, for example, one or more of any of the following: the installation date, period of time of use, and/or lifetime of the outlet and/or filter, water temperature, and water flow rate, can be provided, preferably wherein the display is mounted on or in the faucet tap head or shower head, and the display provides a notification as to when the outlet and/or filter should be replaced. Advantageously, if desired, an organization or institution (such as a hospital) using a plurality of outlets and filters can track these items, e.g., for inventory purposes and/or for replacing the items at the appropriate date.

The display system can be compatible with, for example, one or more software systems, and, if desired, the software system can be accessed via the internet.

Preferably, the display and timer(s) provide for monitoring the changeout target (e.g., date or period of use) of the filter device and outlet following installation of each, e.g., since they may have different and/or user-defined changeout targets. If desired, the user can set the targets of each (e.g., through a security PIN code) dependent on the particular local application. For example, the timer can count down (daily) after being reset following a filter device and/or outlet change, and indicate the time remaining for changeout of each, and display a warning (e.g., a symbol) and negative (day) counter of how long past the target changeout the unit has been installed, should changeout not occur. Other information can be displayed, if desired, e.g., water temperature, sanitation temperature, flow rate, etc.

Desirably, as noted above, the system allows the filter device and outlets to be tracked, e.g., the filter device and outlets can be associated with, for example, a specific head, and/or a location (e.g., a specified sink or shower in a hospital). Thus, for example, the display can reflect one or more of the following (e.g., as one or more barcode displays): the identification of the head itself, the point-of-use location, the filter device, and the outlet. If desired, barcodes (e.g., 2D barcodes) for the filter device and outlet can be scanned upon installation and assigned to a specific head. Barcodes can, for example, include manufacturing traceability information and/or test data. This information can be added to the electronic records/database of the institution, e.g., locally or via a web-based version. Information can be modified and/or updated as needed, e.g., based on various regulations.

EXAMPLES

The following examples further illustrate the invention but, of course, should not be construed as in any way limiting its scope.

In these examples, airborne liquid droplet bacteria challenge tests are carried out, wherein a misting device, using 0.25 mL of a 1×10⁶ colony forming units (CFU)/mL suspension of *Brevondimonas diminuta* inoculated into 678 mL of sterile water (approximately 370 CFU/mL final concentration), simulates the generation of contaminated water droplets and splash back, to represent airborne contamination and splashing generated during hand washing and/or showering.

Since these examples are designed to represent airborne contamination and splashing generated during hand washing and/or showering, rather than the filtration of water using a sterilizing grade water filter, a simulated filter device is utilized, wherein the filter device housing is a solid block, machined to generally correspond to the external dimensions of the housing shown in FIG. 5, and the housing does not contain a filter therein. The bottom surface of the simulated filter device includes magnets to retain test membranes via a stainless steel ring attached to each test membrane. The test membranes, which are retained on the bottom surfaces of the simulated filter devices, are provided for sampling and effective capture of airborne contamination.

These simulated filter devices further including the test membranes providing the base of the filters (configurations with and without outlets and with and without outlet discs are described in more detail below) are placed over a sterile container containing the inoculated water at a height of approximately 13 cm from the surface of the water. An ultrasonic terrarium misting device in the container creates airborne droplets and splashes from the bacteria spiked water beneath the membranes which is collected on the membranes as contamination during a test period of either 30 or 300 seconds. Once misting is complete (positive controls are misted without outlets, negative controls are not misted), the membranes, representing the base of the filter device to be analyzed, are removed using sterile forceps and placed directly onto 142 mm plates of trycase soya agar (TSA), which are incubated at 30° C. for 48 hours.

The configurations tested are as follows: (a) simulated filter device and 70 mm nylon test membrane (for capture of airborne contamination), no disc, no outlet (positive control); (b) simulated filter device, 70 mm nylon test membrane, no disc, standard shower outlet; (c) simulated filter device, 70 mm nylon test membrane, disc 1 (molded polypropylene, without antimicrobial agent; nominal pore size about 2.5 mm), and standard shower outlet; (d) simulated filter device, 70 mm nylon test membrane, disc 2 (sintered polypropylene, without antimicrobial agent; nominal porosity 50 micrometers), and standard shower outlet; (e) simulated filter device, 70 mm nylon test membrane, no disc, standard jet outlet; and (f) simulated filter device, 70 mm nylon test membrane, disc 1, and standard jet outlet.

The shower outlets have openings in the range of about 0.1 to about 2 mm in diameter, typically, averaging about 1 mm in diameter.

The jet outlets have openings grouped more closely than those in the shower outlet, and the openings are in the range of about 1 to about 5 mm in diameter, typically, averaging about 2.5 mm in diameter.

The simulated filters, membranes, discs, outlets, and filter holders are sterilized before use.

Example 1

This example demonstrates that the misting device simulates contamination, and that filters can be contaminated upon direct contact with airborne droplets and splashes from bacteria spiked water.

Three simulated filter devices, each having a 70 mm nylon test membrane covering the base, no disc, and no outlet (positive control, configuration "a" above) are exposed to misting for 30 seconds. The negative control, a fourth simulated filter device, with the same configuration, is not exposed to misting.

The colony forming unit (CFU) count from the negative control filter device is zero. The counts from the three misted filter devices ranged from 88-126, with an average of 109.

Example 2

This example demonstrates that the use of an outlet significantly reduces or eliminates contamination, and the use of an outlet disc with an outlet further reduces or eliminates contamination.

Three sets of simulated filter devices with configurations "b," "c," and "d," respectively, and a negative control, are treated as described in Example 1.

The CFU count with respect to configuration "b" is 1 with respect to two simulated filter devices, and zero with respect to the other simulated filter device and the control.

The CFU counts with respect to configuration "c" and "d" are 0 with respect to the simulated filter devices, and the control.

Example 3

This example demonstrates that the misting device simulates contamination, and that filter devices can be more highly contaminated upon direct contact with airborne droplets and splashes from bacteria spiked water when contacted with the droplets and splashes for an increased period of time.

Three simulated filter devices, each having a 70 mm nylon test membrane covering the base, no disc, and no outlet (configuration "a" above) are exposed to misting for 300 seconds. The negative control, a fourth simulated filter device, with the same configuration, is not exposed to misting.

The procedure is repeated with another set of simulated filter devices.

The colony forming unit (CFU) count from each negative control filter device is zero. The counts from each of the two sets of three misted filter devices are each greater than 300.

Example 4

This example demonstrates that the use of an outlet significantly reduces or eliminates contamination.

Three simulated filter devices with configuration "b," and a negative control, are treated as described in Example 3.

The procedure is repeated with another set of simulated filter devices.

The CFU counts with respect to configuration "b" are 0 with respect to the misted simulated filter devices, and the negative controls.

Example 5

This example demonstrates that the use of an outlet significantly reduces or eliminates contamination.

Three simulated filter devices with each of configurations "b," and "e," and the respective negative controls, are treated as described in Example 3.

The CFU counts with respect to two misted simulated filter devices having configuration "b" are 1 for each filter.

The CFU counts with respect to the other misted simulated filter device, and the negative control, are 0.

The CFU counts with respect to the three misted simulated filter devices having configuration "e" range from 4 to 6, with an average of 5. The CFU count with respect to the negative control is 0.

Example 6

This example demonstrates that the use of an outlet significantly reduces or eliminates contamination, and the use of an outlet disc with an outlet further reduces or eliminates contamination.

Additionally, three simulated filter devices with configuration "e," and a negative control with that configuration, are treated as described in Example 3.

Three simulated filter devices with configuration "f," and a negative control with that configuration, are treated as described in Example 3.

The CFU counts with respect to the three misted simulated filter devices having configuration "e" range from 2 to 10, with an average of 7. The CFU count with respect to the negative control is 0.

The CFU counts with respect to configuration "f" are 0 with respect to the misted simulated filter devices, and the negative control.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A point of use shower or faucet tap system comprising:
an outlet and water filter device for a point of use faucet or a point of use shower comprising:
a sterilizing grade water filter device comprising a sterilizing grade water filter device housing comprising an inlet, a sterilizing grade water filter device housing side wall having an internal surface, and an external surface comprising threads; and a sterilizing grade water filter device housing bottom wall comprising an outer edge and a water effluent portion, wherein the water effluent portion is between the sterilizing grade water filter device housing bottom wall outer edge and the internal surface of the sterilizing grade water filter device housing side wall; a porous sterilizing grade water filter contained in the sterilizing grade water filter device housing, wherein the sterilizing grade water filter device housing provides a fluid flow path between the inlet and the water effluent portion and through the porous sterilizing grade water filter;
a shower attachment head or a faucet tap attachment head, engageable with a removable outlet and the sterilizing grade water filter device;
the removable outlet comprising an outlet housing comprising a polymeric shell comprising a shell side wall having a shell side wall inner surface and a shell side wall outer surface, a shell bottom wall having a shell inner face, a shell outer face, and a plurality of outlet ports, each port comprising an opening allowing water flow from the shell inner face through the shell outer face, and an outlet cavity defined by the shell side wall shell inner surface and the shell bottom wall shell inner face, wherein both the shell side wall shell outer surface and the shell bottom wall shell outer face contact environmental air surrounding the shower attachment head or the faucet tap attachment head when the sterilizing grade water filter device is attached to the attachment head, and;
a hydrophobic porous disc contained in the outlet cavity of the polymeric shell, the hydrophobic porous disc comprising a plurality of pores and having an upstream surface and a downstream surface, the downstream surface facing the shell bottom wall shell inner face,
wherein the shell side wall shell inner surface includes threads releasably engageable with the threads on the external surface of a sterilizing grade water filter device housing side wall, the outlet cavity being suitable for receiving at least a portion of the sterilizing grade water filter device, the removable outlet being removably attached to the sterilizing grade water filter device; and,
a safety retainer for releasably locking the sterilizing grade water filter device to the shower attachment head or the faucet tap attachment head, the safety retainer comprising a handle and a spring-loaded pin having a tip, wherein the tip of the spring-loaded pin engages and disengages with a safety retainer receptacle;
wherein the shower attachment head or the faucet tap attachment head further comprises the handle and the spring-loaded pin; and, the sterilizing grade water filter device housing comprises the safety retainer receptacle.

2. The system of claim 1, wherein the safety retainer receptacle comprises a collar and a depression, for engaging the tip of the spring-loaded pin when releasably locking the sterilizing grade water filter device to the shower attachment head or the faucet tap attachment head, the tip being removable from the collar when the sterilizing grade water filter device is released from the shower attachment head or the faucet tap attachment head.

3. The system of claim 1, wherein the sterilizing grade water filter device further comprises a biased closed one way valve preventing water flow through the shower attachment head or the faucet tap attachment head when the sterilizing grade water filter device is not engaged with the shower attachment head or the faucet tap attachment head.

4. The system of claim 1, wherein the shower attachment head or the faucet tap attachment head further comprises a display for notifying the user as to when the sterilizing grade water filter device or the removable outlet was installed and/or for notifying the user as to when the sterilizing grade water filter device and/or removable outlet should be replaced.

* * * * *